United States Patent
Smith et al.

(10) Patent No.: US 9,457,847 B2
(45) Date of Patent: Oct. 4, 2016

(54) REAR-MOUNTED AERODYNAMIC STRUCTURES FOR CARGO BODIES

(71) Applicant: STEMCO LP, Charlotte, NC (US)

(72) Inventors: Andrew F. Smith, Signal Mountain, TN (US); Jeffrey J. Grossmann, San Francisco, CA (US); Court S. Hinricher, San Francisco, CA (US); Robert R. Cholnoky, Darien, CT (US); Austin A. Duncanson, San Francis, CA (US)

(73) Assignee: STEMCO LP, Charlotte, NC (US)

( * ) Notice: Subject to any disclaimer, the term of this patent is extended or adjusted under 35 U.S.C. 154(b) by 0 days.

(21) Appl. No.: 14/659,583

(22) Filed: Mar. 16, 2015

(65) Prior Publication Data
US 2015/0239512 A1    Aug. 27, 2015

Related U.S. Application Data

(62) Division of application No. 13/662,025, filed on Oct. 26, 2012, now abandoned.

(60) Provisional application No. 61/552,198, filed on Oct. 27, 2011.

(51) Int. Cl.
    *B62D 35/00* (2006.01)
(52) U.S. Cl.
    CPC .................................. *B62D 35/001* (2013.01)
(58) Field of Classification Search
    CPC ................................................... B62D 35/001
    USPC ........................... 296/180.4, 180.1; 180/903
    See application file for complete search history.

(56) References Cited

U.S. PATENT DOCUMENTS

| | | | |
|---|---|---|---|
| 227,401 A | 5/1880 | Chaeles et al. |
| 609,789 A | 8/1898 | George |
| 797,077 A | 8/1905 | Angus et al. |
| 891,537 A | 6/1908 | Graff |
| 1,352,679 A | 9/1920 | Myers |

(Continued)

FOREIGN PATENT DOCUMENTS

| CA | 2166495 A1 | 7/1997 |
|---|---|---|
| CA | 2171398 A1 | 9/1997 |

(Continued)

OTHER PUBLICATIONS

Partial Supplementary European Search Report, European Patent Application No. 12844297.7, mailed Aug. 17, 2015. 6 pages.

(Continued)

*Primary Examiner* — Jason S Morrow
(74) *Attorney, Agent, or Firm* — Perkins Coie LLP

(57) ABSTRACT

A rear-mounted aerodynamic structure for securing to a cargo body includes a three- or four-sided structure having a deployed position for assisting in improving aerodynamic efficiency of the cargo body. The cargo body can be the body of a trailer of a tractor-trailer vehicle or trailer towed behind a vehicle such as a truck. It can comprise a trailer body or other cargo body well-known in the art. A spoiler "flow keeper" mounted to a top surface of the rear of the cargo body, as additional aerodynamic structures or as a stand-alone spoiler for cargo bodies. The three- or four-sided rear-mounted aerodynamic structure can comprise any of a variety of illustrative embodiments shown and described herein.

17 Claims, 17 Drawing Sheets

(56) References Cited

U.S. PATENT DOCUMENTS

| | | |
|---|---|---|
| 1,364,053 A | 12/1920 | Quintin |
| 1,390,793 A | 9/1921 | Kyle et al. |
| 1,517,365 A | 12/1924 | Kleine |
| 1,543,877 A | 6/1925 | Saunders |
| 1,584,275 A | 5/1926 | Chalkley |
| 1,714,609 A | 5/1929 | Massey |
| 1,871,390 A | 8/1932 | Reynolds |
| 1,871,396 A | 8/1932 | Stalker |
| 1,875,276 A | 8/1932 | Steigert |
| 1,879,594 A | 9/1932 | Trey |
| 1,912,138 A | 5/1933 | Hoover |
| 1,913,169 A | 6/1933 | Martin |
| 2,037,942 A | 4/1936 | Stalker |
| 2,199,883 A | 5/1940 | Ishiwata |
| 2,208,075 A | 7/1940 | Jabelmann |
| 2,237,141 A | 4/1941 | Gale et al. |
| 2,338,533 A | 1/1944 | Pash et al. |
| 2,344,515 A | 3/1944 | Massey |
| 2,547,528 A | 4/1951 | Lewis |
| 2,569,354 A | 9/1951 | Tracy et al. |
| 2,569,983 A | 10/1951 | Favre |
| 2,737,411 A | 3/1956 | Potter |
| 2,772,624 A | 12/1956 | Carnes |
| 2,780,980 A | 2/1957 | Kennedy |
| 2,887,243 A | 5/1959 | Murdock, Sr. |
| 2,933,344 A | 4/1960 | Shumaker |
| 2,938,680 A | 5/1960 | Greene et al. |
| 2,964,352 A | 12/1960 | Werner |
| 3,010,754 A | 11/1961 | Shumaker et al. |
| 3,016,700 A | 1/1962 | Howald |
| 3,053,351 A | 9/1962 | Fulcher et al. |
| 3,074,079 A | 1/1963 | Isaacson et al. |
| 3,112,135 A | 11/1963 | Salomonson et al. |
| 3,178,131 A | 4/1965 | Laing |
| 3,214,215 A | 10/1965 | Hansen |
| 3,276,811 A | 10/1966 | Schmidt |
| 3,342,523 A | 9/1967 | Lutgen |
| 3,346,186 A | 10/1967 | Fulton et al. |
| 3,415,566 A | 12/1968 | Kerrigan |
| 3,425,740 A | 2/1969 | Vaughn |
| 3,455,594 A | 7/1969 | Mrlik et al. |
| 3,496,687 A | 2/1970 | Greenberg et al. |
| 3,526,365 A | 9/1970 | Ursery et al. |
| 3,711,146 A | 1/1973 | Madzsar et al. |
| 3,743,343 A | 7/1973 | Grote et al. |
| 3,791,468 A | 2/1974 | Bryan et al. |
| 3,807,787 A | 4/1974 | Gotz |
| 3,834,752 A | 9/1974 | Friedenfeld et al. |
| 3,934,922 A | 1/1976 | MacCready et al. |
| 3,941,334 A | 3/1976 | Cole |
| 3,951,445 A | 4/1976 | Tatom et al. |
| 3,960,402 A | 6/1976 | Keck et al |
| 3,971,586 A | 7/1976 | Saunders et al. |
| 3,977,716 A | 8/1976 | Whited et al. |
| 3,994,451 A | 11/1976 | Cole |
| 3,994,452 A | 11/1976 | Cole et al. |
| 3,999,797 A | 12/1976 | Kirsch et al. |
| 4,006,932 A | 2/1977 | McDonald et al. |
| 4,021,069 A | 5/1977 | Hersh et al. |
| 4,035,013 A | 7/1977 | Abbott et al. |
| 4,053,124 A | 10/1977 | Cole et al. |
| 4,113,299 A | 9/1978 | Johnson et al. |
| 4,117,900 A | 10/1978 | Amick et al. |
| 4,126,974 A | 11/1978 | Hardin et al. |
| 4,142,755 A | 3/1979 | Keedy et al. |
| 4,154,149 A | 5/1979 | Holford et al. |
| 4,174,863 A | 11/1979 | Gotz et al. |
| 4,210,354 A | 7/1980 | Canning et al. |
| 4,214,787 A | 7/1980 | Chain et al. |
| 4,236,745 A | 12/1980 | Davis et al. |
| 4,248,103 A | 2/1981 | Halsall et al. |
| 4,257,641 A | 3/1981 | Keedy et al. |
| 4,269,444 A | 5/1981 | Emory et al. |
| 4,300,797 A | 11/1981 | Whitley et al. |
| 4,316,630 A | 2/1982 | Evans et al. |
| 4,320,920 A | 3/1982 | Goudey et al. |
| 4,349,155 A | 9/1982 | Donguy |
| 4,357,045 A | 11/1982 | Kinford et al. |
| 4,375,898 A | 3/1983 | Stephens et al. |
| 4,379,582 A | 4/1983 | Miwa et al. |
| 4,383,407 A | 5/1983 | Inman et al. |
| 4,384,630 A | 5/1983 | Steiner et al. |
| 4,386,801 A | 6/1983 | Chapman et al. |
| 4,421,354 A | 12/1983 | Lemaster et al. |
| 4,433,865 A | 2/1984 | Crompton et al. |
| RE31,565 E | 4/1984 | Beaulieu |
| 4,451,074 A | 5/1984 | Scanlon et al. |
| D274,322 S | 6/1984 | Hayes et al. |
| 4,457,550 A | 7/1984 | Gielow et al. |
| 4,458,936 A | 7/1984 | Mulholland et al. |
| 4,458,937 A | 7/1984 | Beckmann et al. |
| 4,462,628 A | 7/1984 | Gregg et al. |
| 4,486,046 A | 12/1984 | Whitney et al. |
| 4,489,889 A | 12/1984 | Inman et al. |
| 4,508,380 A | 4/1985 | Sankrithi et al. |
| 4,518,188 A | 5/1985 | Witten et al. |
| 4,525,123 A | 6/1985 | Curci et al. |
| 4,601,508 A | 7/1986 | Kerian |
| 4,611,847 A | 9/1986 | Sullivan |
| 4,640,541 A | 2/1987 | FitzGerald et al. |
| 4,653,788 A | 3/1987 | Di Giusto et al. |
| 4,678,118 A | 7/1987 | Fukami et al. |
| 4,682,808 A | 7/1987 | Bilanin et al. |
| 4,688,841 A | 8/1987 | Moore et al. |
| 4,702,509 A | 10/1987 | Elliott, Sr. et al. |
| 4,706,910 A | 11/1987 | Walsh et al. |
| 4,722,500 A | 2/1988 | Bray |
| 4,741,569 A | 5/1988 | Sutphen et al. |
| 4,746,160 A | 5/1988 | Wiesemeyer |
| 4,773,692 A | 9/1988 | Schleicher et al. |
| 4,784,429 A | 11/1988 | Hodges et al. |
| 4,810,022 A | 3/1989 | Takagi et al. |
| 4,818,015 A | 4/1989 | Scanlon et al. |
| 4,944,550 A | 7/1990 | Drown et al. |
| 4,951,994 A | 8/1990 | Miwa et al. |
| 4,976,349 A | 12/1990 | Adkins |
| 4,978,162 A | 12/1990 | Labbe |
| 5,000,508 A | 3/1991 | Woods et al. |
| 5,058,945 A | 10/1991 | Elliott et al. |
| 5,108,145 A | 4/1992 | Harris et al. |
| 5,156,195 A | 10/1992 | Wehler et al. |
| 5,190,342 A | 3/1993 | Marlowe et al. |
| 5,199,762 A | 4/1993 | Scheele et al. |
| 5,236,347 A | 8/1993 | Andrus et al. |
| 5,237,887 A | 8/1993 | Appleberry et al. |
| 5,240,306 A | 8/1993 | Flemming et al. |
| 5,280,990 A | 1/1994 | Rinard |
| 5,317,880 A | 6/1994 | Spears et al. |
| 5,332,280 A | 7/1994 | DuPont et al. |
| 5,348,366 A | 9/1994 | Baker et al. |
| 5,375,903 A | 12/1994 | Lechner et al. |
| 5,498,059 A | 3/1996 | Switlik |
| 5,570,924 A | 11/1996 | Few et al. |
| 5,609,384 A | 3/1997 | Loewen et al. |
| 5,823,610 A | 10/1998 | Ryan et al. |
| 5,842,734 A | 12/1998 | Lechner et al. |
| 5,857,648 A | 1/1999 | Dailey et al. |
| 5,902,000 A | 5/1999 | Wold et al. |
| 5,908,217 A | 6/1999 | Englar et al. |
| 5,947,548 A | 9/1999 | Carper et al. |
| 6,045,095 A | 4/2000 | Parrish et al. |
| 6,092,861 A | 7/2000 | Whelan |
| 6,170,904 B1 | 1/2001 | Schaedlich et al. |
| 6,205,772 B1 | 3/2001 | Perrier et al. |
| 6,257,654 B1 | 7/2001 | Boivin et al. |
| 6,286,892 B1 | 9/2001 | Bauer et al. |
| 6,286,894 B1 | 9/2001 | Kingham et al. |
| 6,309,010 B1 | 10/2001 | Whitten |
| 6,375,126 B1 | 4/2002 | Sakurai et al. |
| 6,382,708 B1 | 5/2002 | Erdelitsch et al. |
| 6,409,252 B1 | 6/2002 | Andrus |
| 6,418,710 B1 | 7/2002 | Perrier et al. |
| 6,428,084 B1 | 8/2002 | Liss et al. |
| 6,457,766 B1 | 10/2002 | Telnack et al. |

(56) References Cited

U.S. PATENT DOCUMENTS

| | | |
|---|---|---|
| 6,467,833 B1 | 10/2002 | Travers et al. |
| 6,485,087 B1 | 11/2002 | Roberge et al. |
| 6,561,575 B2 | 5/2003 | Fairburn et al. |
| 6,565,112 B2 | 5/2003 | Hanson et al. |
| 6,595,578 B1 | 7/2003 | Calsoyds et al. |
| 6,616,218 B2 | 9/2003 | Bauer et al. |
| 6,644,720 B2 | 11/2003 | Long et al. |
| 6,666,498 B1 | 12/2003 | Whitten et al. |
| 6,669,270 B1 | 12/2003 | Card et al. |
| 6,742,616 B2 | 6/2004 | Leban et al. |
| 6,779,834 B1 | 8/2004 | Keller et al. |
| 6,789,839 B1 | 9/2004 | Samuelson et al. |
| 6,799,791 B2 * | 10/2004 | Reiman ............... B62D 35/004 296/180.1 |
| 6,846,035 B2 | 1/2005 | Wong et al. |
| 6,854,788 B1 | 2/2005 | Graham |
| 6,877,793 B2 | 4/2005 | Cory et al. |
| 6,886,882 B2 | 5/2005 | Farlow et al. |
| 6,915,611 B2 | 7/2005 | Reiman et al. |
| 6,959,958 B2 | 11/2005 | Basford et al. |
| 6,974,178 B2 | 12/2005 | Ortega et al. |
| 7,008,004 B2 | 3/2006 | Ortega et al. |
| 7,008,005 B1 | 3/2006 | Graham et al. |
| 7,118,164 B2 | 10/2006 | Frank et al. |
| 7,147,270 B1 | 12/2006 | Andrus et al. |
| 7,192,077 B1 | 3/2007 | Hilleman et al. |
| 7,207,620 B2 | 4/2007 | Cosgrove et al. |
| 7,240,958 B2 | 7/2007 | Skopic et al. |
| 7,243,980 B2 | 7/2007 | Vala |
| 7,374,229 B1 | 5/2008 | Noll et al. |
| 7,374,230 B2 | 5/2008 | Breidenbach et al. |
| 7,380,868 B2 | 6/2008 | Breidenbach et al. |
| 7,404,592 B2 | 7/2008 | Reiman et al. |
| 7,431,381 B2 | 10/2008 | Wood et al. |
| 7,484,791 B1 | 2/2009 | Chen et al. |
| 7,549,695 B2 | 6/2009 | Royer et al. |
| 7,578,541 B2 | 8/2009 | Layfield et al. |
| 7,618,086 B2 | 11/2009 | Breidenbach et al. |
| 7,625,034 B1 | 12/2009 | Fitzgerald et al. |
| 7,641,262 B2 | 1/2010 | Nusbaum et al. |
| 7,712,821 B2 | 5/2010 | Moscoso et al. |
| 7,740,304 B1 | 6/2010 | Breu et al. |
| 7,748,771 B2 | 7/2010 | Distel et al. |
| 7,748,772 B2 | 7/2010 | Boivin et al. |
| 7,780,224 B2 | 8/2010 | Roush et al. |
| 7,784,854 B2 | 8/2010 | Breidenbach et al. |
| 7,789,412 B2 | 9/2010 | Algüera et al. |
| 7,789,453 B2 | 9/2010 | Roush et al. |
| 7,794,011 B2 | 9/2010 | Kjellgren et al. |
| 7,806,464 B2 | 10/2010 | Cardolle et al. |
| 7,845,708 B2 | 12/2010 | Breidenbach |
| 7,850,224 B2 | 12/2010 | Breidenbach et al. |
| 7,854,468 B2 | 12/2010 | Vogel et al. |
| 7,857,376 B2 | 12/2010 | Breidenbach |
| 7,862,102 B1 | 1/2011 | Benton et al. |
| 7,887,120 B2 | 2/2011 | Boivin et al. |
| 7,938,475 B2 | 5/2011 | Boivin et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,950,720 B2 | 5/2011 | Skopic et al. |
| 7,976,096 B2 | 7/2011 | Holubar et al. |
| 7,992,923 B2 | 8/2011 | Dayton et al. |
| D649,090 S | 11/2011 | Boivin et al. |
| 8,079,634 B2 | 12/2011 | Visser et al. |
| 8,100,461 B2 | 1/2012 | Smith et al. |
| 8,177,287 B2 | 5/2012 | Vogel et al. |
| 8,251,436 B2 | 8/2012 | Henderson et al. |
| 8,272,680 B2 | 9/2012 | Breidenbach et al. |
| 8,292,351 B2 | 10/2012 | Boivin et al. |
| 8,360,509 B2 | 1/2013 | Smith et al. |
| 8,360,510 B2 | 1/2013 | Smith et al. |
| 8,449,017 B2 | 5/2013 | Boivin et al. |
| 8,480,162 B2 | 7/2013 | Breidenbach et al. |
| 8,590,961 B2 | 11/2013 | Breidenbach |
| 8,608,228 B2 | 12/2013 | Visentin et al. |
| 8,622,461 B2 | 1/2014 | Breidenbach et al. |
| 8,678,474 B1 | 3/2014 | Boivin et al. |
| 8,708,398 B2 | 4/2014 | Breidenbach |
| 8,708,399 B2 | 4/2014 | Grossmann et al. |
| 8,845,007 B2 | 9/2014 | Tuerk et al. |
| 8,876,191 B2 | 11/2014 | Breidenbach |
| 9,039,069 B2 | 5/2015 | Smith et al. |
| 9,126,638 B2 | 9/2015 | Breidenbach |
| 9,145,177 B2 | 9/2015 | Smith et al. |
| 9,180,919 B2 | 11/2015 | Breidenbach |
| 2002/0005655 A1 | 1/2002 | Bauer et al. |
| 2002/0021023 A1 | 2/2002 | Leban et al. |
| 2002/0030384 A1 | 3/2002 | Basford et al. |
| 2003/0057736 A1 | 3/2003 | Long et al. |
| 2003/0205913 A1 | 11/2003 | Leonard et al. |
| 2003/0227194 A1 | 12/2003 | Farlow et al. |
| 2004/0118055 A1 | 6/2004 | Reiman et al. |
| 2004/0119319 A1 | 6/2004 | Reiman et al. |
| 2004/0256885 A1 | 12/2004 | Bui et al. |
| 2004/0261335 A1 | 12/2004 | Eungard |
| 2005/0040637 A1 | 2/2005 | Wood et al. |
| 2005/0146161 A1 | 7/2005 | Uland et al. |
| 2005/0159075 A1 | 7/2005 | Isobe et al. |
| 2005/0204681 A1 | 9/2005 | Zeigler et al. |
| 2006/0157623 A1 | 7/2006 | Voglsinger et al. |
| 2006/0252361 A1 | 11/2006 | Henderson et al. |
| 2006/0273625 A1 | 12/2006 | Andrus et al. |
| 2007/0001481 A1 | 1/2007 | Breidenbach et al. |
| 2007/0120397 A1 | 5/2007 | Layfield et al. |
| 2007/0126261 A1 | 6/2007 | Breidenbach et al. |
| 2007/0200390 A1 | 8/2007 | Lotarev et al. |
| 2007/0228772 A1 | 10/2007 | Froeschle et al. |
| 2007/0246969 A1 | 10/2007 | Smith et al. |
| 2008/0048468 A1 | 2/2008 | Holubar et al. |
| 2008/0061597 A1 | 3/2008 | Reiman et al. |
| 2008/0061598 A1 | 3/2008 | Reiman et al. |
| 2008/0093886 A1 | 4/2008 | Nusbaum et al. |
| 2008/0184835 A1 | 8/2008 | Breidenbach et al. |
| 2008/0217957 A1 | 9/2008 | Schoon et al. |
| 2008/0272617 A1 | 11/2008 | Roush et al. |
| 2008/0290686 A1 | 11/2008 | Royer et al. |
| 2008/0303310 A1 | 12/2008 | Breidenbach et al. |
| 2008/0309122 A1 | 12/2008 | Smith et al. |
| 2009/0096250 A1 | 4/2009 | Kohls et al. |
| 2009/0140542 A1 | 6/2009 | Breidenbach et al. |
| 2009/0146453 A1 | 6/2009 | Ortega et al. |
| 2009/0179456 A1 | 7/2009 | Holubar |
| 2009/0200834 A1 | 8/2009 | Vogel et al. |
| 2009/0212594 A1 | 8/2009 | Breidenbach et al. |
| 2009/0212595 A1 | 8/2009 | Heppel et al. |
| 2009/0212596 A1 | 8/2009 | Reiman et al. |
| 2009/0230726 A1 | 9/2009 | Reiman et al. |
| 2009/0236872 A1 | 9/2009 | Wood et al. |
| 2010/0066123 A1 | 3/2010 | Ortega et al. |
| 2010/0106380 A1 | 4/2010 | Salari et al. |
| 2010/0164249 A1 | 7/2010 | Nusbaum et al. |
| 2010/0201153 A1 | 8/2010 | Pesotini et al. |
| 2010/0222671 A1 | 9/2010 | Cohen et al. |
| 2010/0225143 A1 | 9/2010 | Skopic et al. |
| 2011/0037291 A1 | 2/2011 | Pickering et al. |
| 2011/0068605 A1 | 3/2011 | Domo et al. |
| 2011/0084516 A1 | 4/2011 | Smith et al. |
| 2011/0084517 A1 | 4/2011 | Vogel et al. |
| 2011/0095564 A1 | 4/2011 | Chen et al. |
| 2011/0095565 A1 | 4/2011 | Chen et al. |
| 2011/0095566 A1 | 4/2011 | Chen et al. |
| 2011/0115254 A1 | 5/2011 | Skopic et al. |
| 2011/0175394 A1 | 7/2011 | Breidenbach et al. |
| 2011/0210578 A1 | 9/2011 | Breidenbach et al. |
| 2011/0304173 A1 | 12/2011 | Breidenbach et al. |
| 2012/0001451 A1 | 1/2012 | Breidenbach et al. |
| 2012/0086233 A1 | 4/2012 | Visser et al. |
| 2012/0086234 A1 | 4/2012 | Visser et al. |
| 2012/0104792 A1 | 5/2012 | Smith et al. |
| 2012/0223544 A1 | 9/2012 | Benton et al. |
| 2012/0235441 A1 | 9/2012 | Dayton et al. |

(56) References Cited

U.S. PATENT DOCUMENTS

| | | | |
|---|---|---|---|
| 2012/0299330 | A1 | 11/2012 | Breidenbach et al. |
| 2013/0038086 | A1 | 2/2013 | Breidenbach et al. |
| 2013/0057019 | A1 | 3/2013 | Breidenbach et al. |
| 2013/0076064 | A1 | 3/2013 | Smith et al. |
| 2013/0106136 | A1 | 5/2013 | Smith et al. |
| 2013/0175824 | A1 | 7/2013 | Smith et al. |
| 2013/0249241 | A1 | 9/2013 | Baker et al. |
| 2014/0117713 | A1 | 5/2014 | Baker |
| 2014/0217775 | A1 | 8/2014 | Breidenbach et al. |
| 2014/0319870 | A1 | 10/2014 | Breidenbach et al. |
| 2014/0346807 | A1 | 11/2014 | Breidenbach |
| 2015/0266520 | A1 | 9/2015 | Breidenbach |

FOREIGN PATENT DOCUMENTS

| | | |
|---|---|---|
| CA | 2221593 A1 | 7/1999 |
| CA | 2311204 A1 | 1/2001 |
| CA | 2281064 A1 | 2/2001 |
| CA | 2315339 A1 | 2/2001 |
| CA | 2316584 A1 | 2/2001 |
| CA | 2450243 A1 | 12/2002 |
| CA | 2510464 A1 | 7/2004 |
| CA | 2361224 C | 2/2006 |
| DE | 2911084 A1 | 9/1980 |
| DE | 2922130 A1 | 12/1980 |
| DE | 3817497 A1 | 12/1988 |
| DE | 19640965 A1 | 4/1997 |
| DE | 29705882 U1 | 7/1997 |
| DE | 29623407 U1 | 7/1998 |
| DE | 10228658 A1 | 1/2004 |
| DE | 10240504 A1 | 3/2004 |
| DE | 10316105 A1 | 10/2004 |
| EP | 1870321 A1 | 12/2007 |
| FR | 2623155 A1 | 5/1989 |
| GB | 2207398 A | 2/1989 |
| JP | 06016157 A | 1/1994 |
| WO | 2007005344 A2 | 1/2007 |
| WO | 2007079306 A2 | 7/2007 |
| WO | 2008024386 A2 | 2/2008 |
| WO | 2008124573 A1 | 10/2008 |
| WO | 2008144025 A3 | 11/2008 |
| WO | 2014011886 A1 | 1/2014 |

OTHER PUBLICATIONS

Notification of Transmittal of the International Search Report and the Written Opinion of the International Searching Authority, or the Declaration relating to PCT Application No. PCT/US06/24642 (Jul. 27, 2007).

Clarkson University, Kenneth Visser, 2 pages, http://www.clarkson.edu/mae/faculty_pages/visser.html.

Deschenes, et al., Mechanical and Aeronautical Engineering, Mechanical and Aeronautical Engineering, Clarkson University; 2 Pages.

International Search Report and Written Opinion of the International Searching Authority of the European Patent Office for PCT/US2012/056365, mailed Feb. 27, 2013. 10 pages.

International Search Report and Written Opinion of the International Searching Authority of the European Patent Office for PCT/US2008/006374, mailed Nov. 14, 2008. 14 pages.

International Search Report and Written Opinion of the International Searching Authority of the European Patent Office for PCT/US2011/055758, mailed Mar. 2, 2012. 13 pages.

International Search Report and Written Opinion of the International Searching Authority of the European Patent Office for PCT/US2013/050083, mailed Oct. 24, 2013. 9 pages.

International Search Report and Written Opinion of the International Searching Authority of the United States Patent Office for PCT/US12/62237, mailed Jan. 15, 2013. 8 pages.

International Search Report and Written Opinion, Mailed Apr. 6, 2015.

Ken Visser, "Drag Reduction of Tractor Trailers", Clarkson University, Nov. 2005, 4 pages.

Machine translation of DE19524825 printed from the internet Nov. 3, 2010.

McCallen, et al., "Progress in Reducing Aerodynamic Drag for Higher Efficiency of Heavy Duty Trucks (Class 7-8)", Lawrence Livermore National Laboratory, Apr. 1999, 14 pages.

Ogburn, et al., "Truck Efficiency and GHG Reduction Opportunities in the Canadian Truck Fleet", Rocky Mountain Institute, 13 pages.

Ortega, et al., "An Experimental Study of Drag Reduction Devices for a Trailer Underbody and Base", Lawrence Livermore National Laboratory, Jun. 4, 2004, 17 pages.

Randal Scott Funderburk, "An Investigation of a Drag Reducing Device for Tractor-Trailers", A Thesis in Mechanical Engineering, May 1996, 128 pages.

Randall L. Peterson, "Drag Reduction Obtained by the Addition of a Boattail to a Box Shaped Vehicle", NASA Contractor Report 163113, Aug. 1981, 32 pages.

Salari, "Heavy Vehicle Drag Reduction Devices: Computational Evaluation & Design", DOE Heavy Vehicle Systems Review, Apr. 2006, 24 pages.

Smith, et al., "U.S. Appl. No. 61/600,579, Rear-Mounted Retractable Aerodynamic Structure for Cargo Bodies", Published in: US.

U.S. Department of Energy, "Heavy Vehicle Systems Optimization", FreedomCAR and Vehicle Technologies Program, 2004 Annual Progress Report, Feb. 2005, 206 pages.

U.S. Appl. No. 60/927,614, titled "Aerodynamic Trailer With Sliding Rear Door", filed May 4, 2007 by Mark Roush.

U.S. Appl. No. 60/938,697, titled "Rear-Mounted Aerodynamic Structure for Truck Cargo Bodies", filed May 17, 2007 by Andrew F. Smith et al.

U.S. Appl. No. 61/039,411, titled "Rear-Mounted Aerodynamic Structure for Truck Cargo Bodies", filed Mar. 25, 2008 by Andrew F. Smith et al.

U.S. Appl. No. 61/065,490, titled "Self-Deploying Drag Reducing Device", filed Feb. 12, 2008 by Lee Telnack, et al.

U.S. Appl. No. 61/070,669, titled "Rounded Cargo Doors for Trailers and Trucks", filed Mar. 25, 2008 by Mark Roush.

U.S. Appl. No. 61/070,670, titled "Drag Reduction Arrangement for Cargo Trucks and Trailers", filed Mar. 25, 2008 by Mark Roush.

* cited by examiner

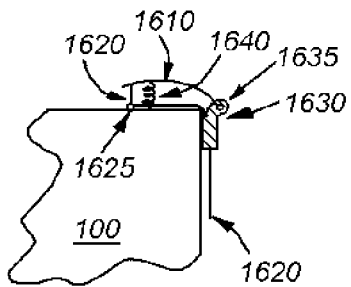
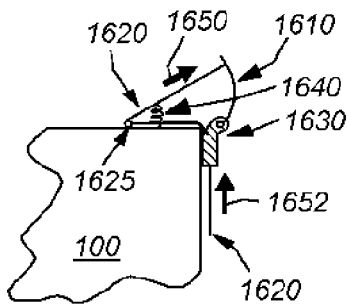
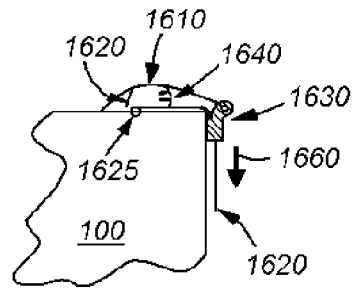
Fig. 16A          Fig. 16B          Fig. 16C
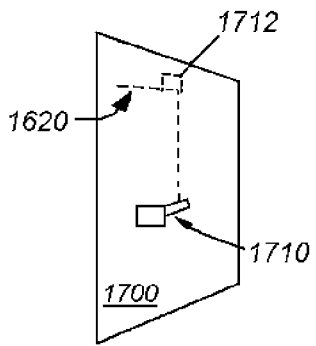
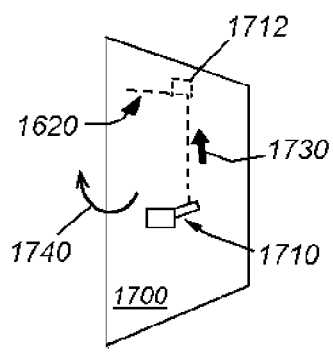
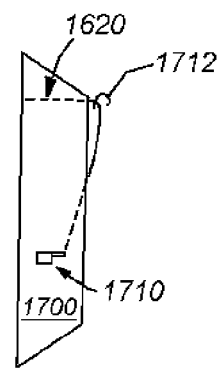
Fig. 17A          Fig. 17B          Fig. 17C
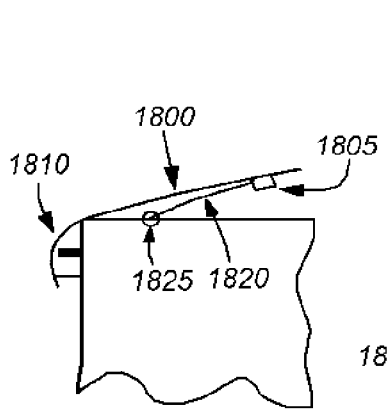
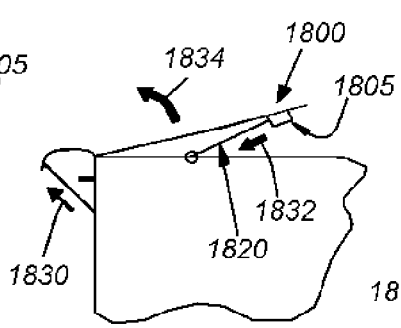
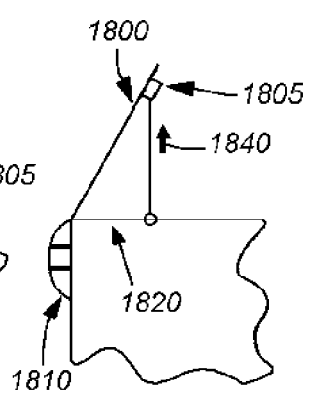
Fig. 18A          Fig. 18B          Fig. 19

REAR-MOUNTED AERODYNAMIC STRUCTURES FOR CARGO BODIES

RELATED APPLICATIONS

This application is a divisional of U.S. patent application Ser. No. 13/662,025, filed Oct. 26, 2012, entitled REAR-MOUNTED AERODYNAMIC STRUCTURES FOR CARGO BODIES, which application claims the benefit of U.S. Provisional Application Ser. No. 61/552,198, filed Oct. 27, 2011, entitled REAR-MOUNTED AERODYNAMIC STRUCTURES FOR CARGO BODIES, the entire disclosures of which is herein incorporated by reference.

FIELD OF THE INVENTION

The present invention relates to aerodynamic structures that are secured to the rear of cargo bodies, for example, on trucks or trailers, and other aerodynamic structures to improve airflow around the cargo body.

BACKGROUND OF THE INVENTION

Trucking is the primary mode of long-distance and short-haul transport for goods and materials in the United States, and many other countries. Trucks typically include a motorized cab in which the driver sits and operates the vehicle. The cab is attached to a box-like cargo section. Smaller trucks typically include an integral cargo section that sits on a unified frame which extends from the front wheels to the rear wheel assembly. Larger trucks often include a detachable cab unit, with multiple driven axles, and a separate trailer with a long box-like cargo unit seated atop two or more sets of wheel assemblies. These truck assemblages are commonly referred to as "semi-trailers" or "tractor trailers." Most modern trucks' cabs, particularly those of tractor trailers, have been fitted with aerodynamic fairings on their roof, sides and front. These fairings assist in directing air over the exposed top of the box-like cargo body, which typically extends higher (by several feet) than the average cab roof. The flat, projecting front face of a cargo body is a substantial source of drag, above the cab roof. The use of such front-mounted aerodynamic fairings in recent years has served to significantly lower drag and, therefore, raise fuel economy for trucks, especially those traveling at high speed on open highways.

However, the rear end of the truck's cargo body has remained the same throughout its history. This is mainly because most trucks include large swinging or rolling doors on their rear face. Trucks may also include a lift gate or a lip that is suited particularly to backing the truck into a loading dock area so that goods can be unloaded from the cargo body. It is well-known that the provision of appropriate aerodynamic fairings (typically consisting of an inwardly tapered set of walls) would further reduce the aerodynamic profile of the truck by reducing drag at the rear face. The reduction of drag, in turn, increases fuel economy.

To improve the aerodynamics of a truck or trailer cargo body by reducing drag, several solutions have been provided that focus on trucks having swinging doors, which are not always readily applicable to cargo bodies having rolling doors. For useful background information on aerodynamic structures for swinging cargo doors, refer to U.S. patent application Ser. No. 12/122,645, entitled REAR-MOUNTED AERODYNAMIC STRUCTURE FOR TRUCK CARGO BODIES, by Smith et al., and U.S. patent application Ser. No. 12/903,770, entitled REAR-MOUNTED AERODYNAMIC STRUCTURE FOR TRUCK CARGO BODIES, by Smith et al., which are both incorporated herein by reference as background material.

Most attempts to provide aerodynamic structures that integrate with the structure and function of the rear cargo doors of a truck have been unsuccessful and/or impractical to use and operate. Such rear aerodynamic structures are typically large and difficult to remove from the rear so as to access the cargo doors when needed. One approach is to provide a structure that swings upwardly, completely out of the path of the doors. However, aerodynamic structures that swing upwardly require substantial strength or force to be moved away from the doors, and also require substantial height clearance above an already tall cargo body. Other solutions have attempted to provide an aerodynamic structure that hinges to one side of the cargo body. While this requires less force to move, it also requires substantial side clearance—which is generally absent from a closely packed, multi-truck loading dock.

In fact, most loading dock arrangements require that the relatively thin cargo doors of conventional trucks swing open fully to about 270 degrees so that they can be latched against the adjacent sides of the cargo body. Only in this manner can the truck be backed into a standard-side-clearance loading dock, which is often populated by a line of closely-spaced trailers that are frequently entering and leaving the dock. In such an environment, side-projecting or top-projecting fairings would invariably interfere with operations at the loading dock.

Another challenge to providing a rear aerodynamic structure is the prompting of a user to deploy the aerodynamic structure at the appropriate time. In particular, if this is performed too late, it may not have the desired effectiveness on improving fuel efficiency and aerodynamic drag, and if performed at lesser speeds, the aerodynamic structure may be unnecessary. It is therefore desirable to provide a straightforward and low-cost deployment system that is automatically deployable.

In the face of ever-increasing fuel costs, it is critical to develop aerodynamic structures that can be applied to the rear of a truck cargo body, either as an original fitment, or by retrofit to existing vehicles. These structures should exhibit durability and long service life, be easy to use by the average operator, not interfere with normal loading and unloading operations through a rear cargo door, and not add substantial additional cost or weight to the vehicle. The structure should exhibit a low profile on the vehicle frame and/or doors, not impede side clearance when the doors are opened, and where possible, allow for clearance with respect to conventional door latching mechanisms. Such structures should also allow for lighting on the rear, as well as other legally required structures. Moreover, given the large existing fleet of trucks and trailers, it is highly desirable that an aerodynamic structure be easily and inexpensively retrofittable to a wide range of existing vehicles without undue customization.

SUMMARY OF THE INVENTION

A three- or four-sided aerodynamic structure improves the airflow associated with the movement of a cargo body, such as a body of a truck or trailer. The three-sided aerodynamic structure includes an upper panel and a side panel disposed on each of a pair of doors of the cargo body that, when in the deployed position, define a three-sided aerodynamic structure at the rear of the cargo body. The four-sided aerodynamic structure further includes a pair of bottom panels for defining a four-sided aerodynamic structure when in the deployed position. A swingarm can also be incorporated with the three- or four-sided aerodynamic structure, operatively connecting the upper panel, side panel and the cargo body door, so that the panels move in a coordinated manner.

In an illustrative embodiment the top or upper panel can comprise a lightweight panel that incorporates an actuator (e.g. a gas spring) to bias the side panel open. According to another illustrative embodiment, the upper panel can be operatively connected to the side panel via a linkage, which connects the movement of the side panel to the top panel so that opening the side panel forces the top panel open. Similarly, collapsing the lateral panel, through the linkage, pulls down on the top panel to assist with closing the overall aerodynamic structure.

In another embodiment, automatic opening or deployment of the doors, under bias of the actuator, can be provided using a top-mounted or side-mounted pivoting tab structure, that causes a latch cable or other switching device to be released when the tab pivots in response to drag/wind resistance at a predetermined travel speed. This allows for non-deployment at low speeds (e.g. city driving, where the extra length could be problematic), while higher (e.g., highway) speeds cause deployment of the aerodynamic structure. The tab is operatively connected by, illustratively, a cable assembly that is secured to a latch or an aerodynamic panel. When the actuator biases the panel outwardly, it tensions the cable, causing the tab to pivot back into a low-drag configuration.

In another embodiment, a rear-mounted aerodynamic structure comprises an upper panel and a side panel each hingedly mounted on a door of a cargo body, that hinge between a folded position to a deployed position in which the upper panel and the side panel together define an aerodynamic structure with an internal cavity. The aerodynamic structure can further include a cantilevered upper panel hinge having an axis of rotation that is cantilevered up above the door of the cargo body such that the top panel is located flush with the top of the trailer in the deployed position, and the top panel is moved around a side of the trailer with the trailer door when in the folded position.

In accordance with illustrative embodiments, a dual-axis hinge can be included between the door and the trailer frame that has a first hinge with a rotation axis disposed rearwardly away from a rear end of the cargo body, and a diagonal link to a second hinge on the trailer door, such that the trailer door is disposed away from the trailer to allow room for the folded upper panel and the side panel when folded on the door and when the trailer door is in an open position, with the door folded against the side of the trailer.

In illustrative embodiments, an upper panel crash bar can be provided that is secured to the upper panel that improves contact angle in collision and assists folding of the top panel to avoid damage to the upper panel. A plurality of bi-directional spring-loaded hinges can also be provided that are biased to hold the upper panel and the side panel in the deployed position, but permit inward-folding of the upper panel and the side panel when the door of the cargo body is opened and the side panel contacts a side of the trailer and pushes the side panel inward.

BRIEF DESCRIPTION OF THE DRAWINGS

The invention description below refers to the accompanying drawings, of which:

FIG. 16A is a partial top cross-sectional view of an automatically opening aerodynamic structure assembly employing a side drag tab, according to an illustrative embodiment, showing the side drag tab arrangement when the aerodynamic structure is in the collapsed position;

FIG. 16B is a partial top cross-sectional view of the automatically opening aerodynamic structure assembly employing the side drag tab, showing the side drag tab arrangement when the cargo body has reached a sufficient speed to cause the aerodynamic structure to start to open into the deployed position, according to the illustrative embodiment;

FIG. 16C is a partial top cross-sectional view of the automatically opening aerodynamic structure assembly employing the side drag tab, showing the side drag tab arrangement when the aerodynamic structure has opened to the fully deployed position with the side drag tab forced inwardly in a close-conforming profile against the cargo body, according to the illustrative embodiment;

FIG. 17A is a partial rear perspective view of the side panel collapsed against the door and including a side drag tab latch and associated cable assembly mounted to an inside of the panel, according to the illustrative embodiment;

FIG. 17B is a partial rear perspective view of the side panel being released by the side drag tab latch and associated cable assembly to open the aerodynamic structure into the deployed position, according to the illustrative embodiment;

FIG. 17C is a partial rear perspective view of the side panel shown in the deployed position, as fully deployed by the actuator, as tension from the cable assembly biases the tab inward to a low drag, close-conforming profile, according to the illustrative embodiment;

FIG. 18A is a top cross-sectional view of a cable routing assembly for maintaining height of the cable assembly, showing a side drag tab arrangement when the aerodynamic structure in the collapsed position, according to an illustrative embodiment;

FIG. 18B is a top cross-sectional view of the cable routing assembly for maintaining height of the cable assembly, showing the side drag tab arrangement when the cargo body has reached a sufficient speed to cause the aerodynamic structure to start to open into the deployed position, according to the illustrative embodiment;

FIG. 19 is a top cross-sectional view of the other cable routing assembly for maintaining height of the cable assembly, showing the side drag tab arrangement when the aerodynamic structure has opened to the fully deployed position, according to the illustrative embodiment;

DETAILED DESCRIPTION

A rear-mounted aerodynamic structure for securing to a cargo body includes a three- or four-sided structure having a deployed position for assisting in improving aerodynamic efficiency of the cargo body. The cargo body can be the body of a trailer of a tractor-trailer vehicle or trailer towed behind a vehicle such as a truck. It can comprise a trailer body or other cargo body well-known in the art. In an illustrative embodiment, a spoiler "flow keeper" is mounted to a top surface of the rear of the cargo body, as an additional aerodynamic structure or as a standalone spoiler for cargo bodies. The three- or four-sided rear-mounted aerodynamic structure can comprise any of a variety of illustrative embodiments shown and described herein, as well as additional aerodynamic structures as shown and described herein.

I) Rear-Mounted Aerodynamic Structure Including Upper Panel and Side Panel

Figure 1:
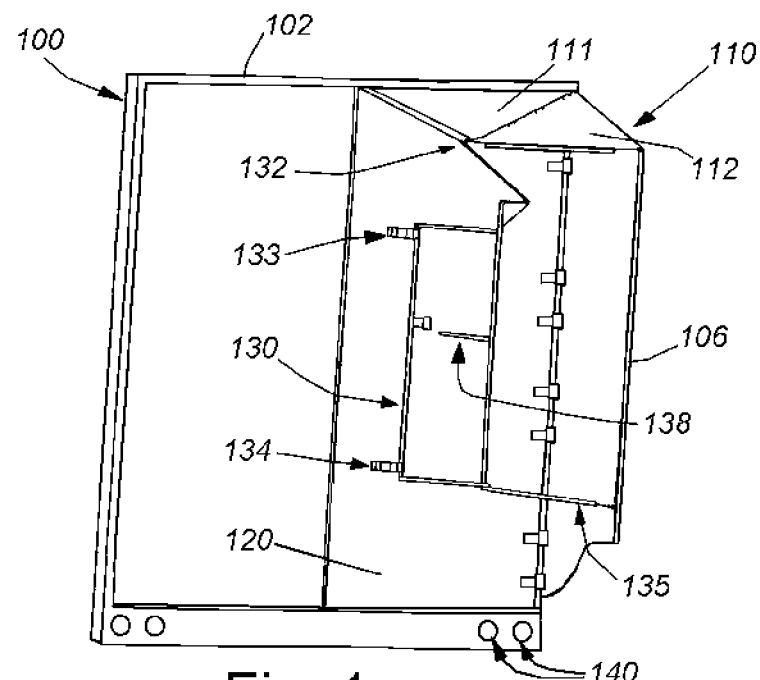
FIG. 1 is a rear perspective view of a single door-mounted rear aerodynamic structure mounted on a cargo body depicted in a deployed position, according to an illustrative embodiment.

Reference is made to FIG. 1 showing a rear perspective view of a single door-mounted rear aerodynamic structure mounted on a cargo body, such as a trailer 100, shown in a deployed position, according to an illustrative embodiment. The single door-mounted rear aerodynamic structure is mounted at a rear end 102 of the cargo body 100 and includes a side panel 106 and a top panel 110 that together form half of a three-sided structure (i.e. two lateral sides and a top side) when deployed. Although not shown, a bottom panel can also be included in the structure to define, together with the upper and side panels, half of a four-sided structure when deployed. The structure can comprise a three- or four-sided structure in accordance with the illustrative embodiment to achieve the functionalities described herein. The top or upper panel 110 consists of a pair of foldable upper panel sections 111 and 112.

A swingarm 130 can be provided having a direct link to the upper panel 110 at 132, is secured to the door 120 at 133 and 134, and to the lower trailing corner 135 of the side panel 106. The swingarm 130 comprises a tie-rod or other appropriate mechanism well-known in the art. A piston 138 or other appropriate mechanism is provided for additional structural support for the swingarm 130 and to assist in movement of the swingarm 130 and overall aerodynamic structure.

Figure 2:
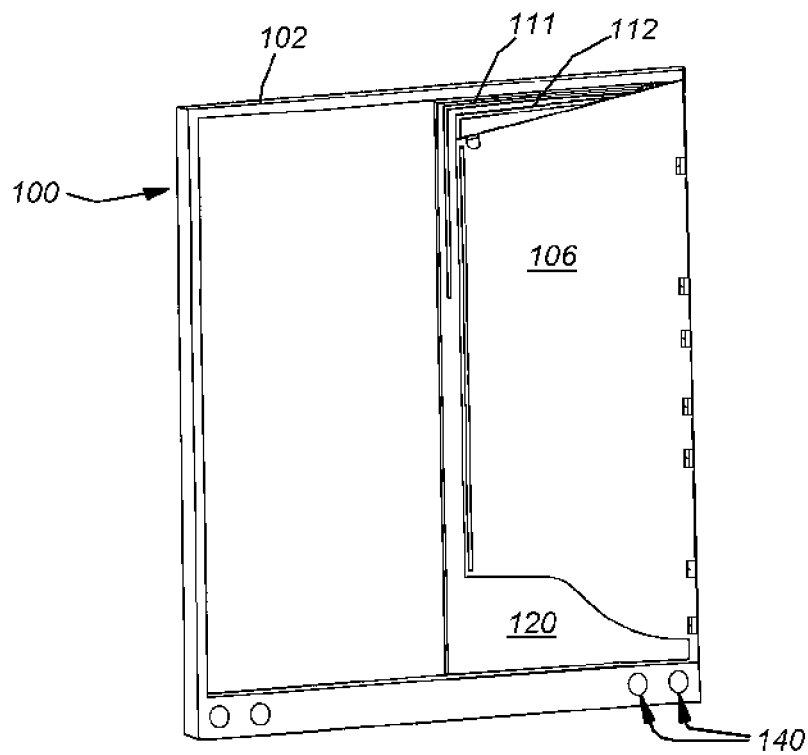
FIG. 2 is a rear perspective view of the single door-mounted rear aerodynamic structure mounted on a cargo body depicted in a retracted position, according to the illustrative embodiment.

The aerodynamic structure is shown in the collapsed position in FIG. 2, with the side panel 106 at least partially overlying the upper split-panel having foldable upper panel sections 111 and 112. The side panel at least partially overlies the upper split-panel to cover the instance of shorter than 4' devices, where the side (lateral) panel does not cover the entire width of the trailer door. As shown, when in the folded position, the door 120 of the cargo body is accessible and free to move and rotate with the aerodynamic structure mounted thereon. Also the lights 140 are visible when the aerodynamic structure is in the folded position shown in FIG. 2, as well as in the deployed position as shown in FIG. 1.

Figure 3:
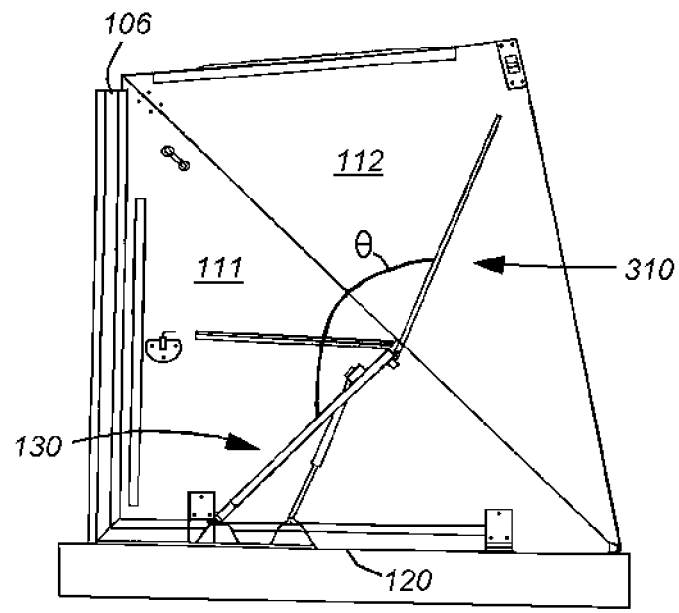
FIG. 3 is a perspective view of the upper panel showing the swingarm and angle between the halves of the upper panel, as viewed from the bottom of the aerodynamic structure, according to the illustrative embodiment.

As shown in FIG. 3, according to the illustrative embodiment, the angle, θ, formed between the swingarm 130 and the swingarm tube 310 is less than 180 degrees. An angle of less than 180 degrees, when deployed, allows the inward movement of the side panel to have a mechanical advantage to close the swingarm 130 and, subsequently, the upper panel 110, to result in the folded configuration as shown in FIG. 2.

Lightweight Upper Panel

Figure 4:
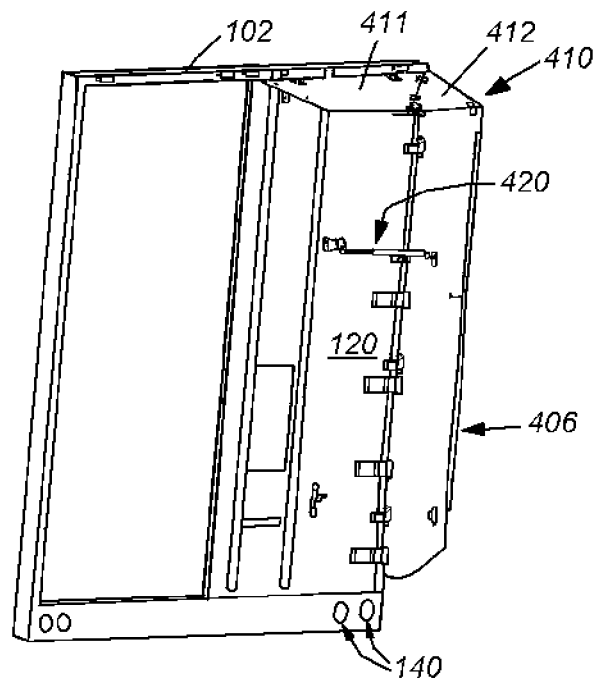
FIG. 4 is a perspective view of a single door-mounted rear aerodynamic structure mounted on a cargo body depicted in the deployed position, including a lightweight upper panel, according to an illustrative embodiment.

FIG. 4 is an illustrative embodiment of one half of a three-sided aerodynamic structure including a side panel 406 and a lightweight upper panel 410. The lightweight upper panel includes foldable upper panel sections 411 and 412, which allow the top panels to open a portion of the way, but not completely. Gravity exerted on the upper panel, when in a stationary position, causes a slight sag in the upper panel. This advantageously allows a user or driver to push in on a lower corner of the side panel and correspondingly cause the upper panel to close. Further, a lightweight top panel allows the naturally occurring pressure vacuum at the rear 102 of the trailer at speeds in excess of 35 miles per hour to provide a lifting force, moving the top panel sections 411 and 412 upward into a coplanar, aerodynamically optimal position. Accordingly, slowing down or stopping the trailer allows the top panel sections to again sag for ease of closing when desired.

Linkage Assembly

Figure 5:
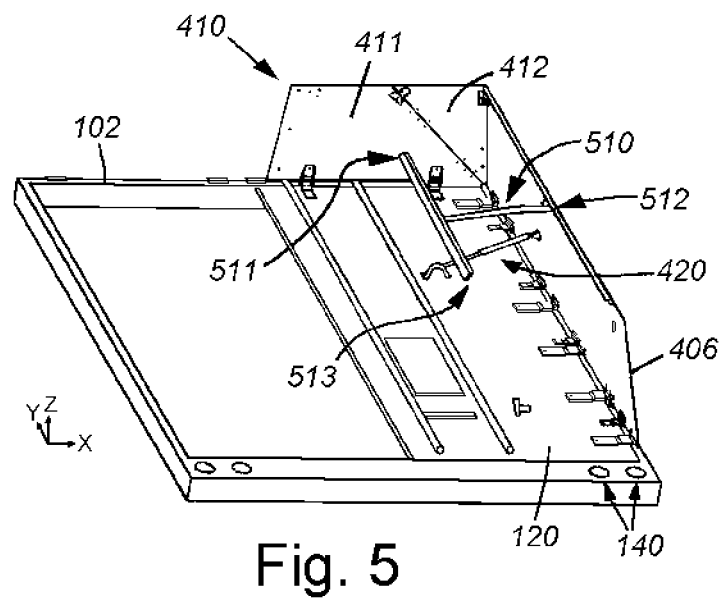
FIG. 5 is a rear perspective view of a single door-mounted rear aerodynamic structure mounted on a cargo body, as viewed from the bottom of the aerodynamic structure, and including a three-pronged linkage, according to an illustrative embodiment.

A three-pronged linkage 510 can also be provided to assist in opening and closing the aerodynamic structure, as shown in FIG. 5, as viewed from the bottom of the trailer. The linkage 510 connects movement of the side panel 406 to the top panel 410 so that opening the side panel 406 causes the top panel to open, thereby significantly improving the mechanical advantage for the driver when closing the device. The linkage 510 has one point of rotation and extends different directions. The linkage 510 is secured to foldable upper section 411 at 511, another member secured to the side panel 406 at 512 and to the door 120 at 513. Including the linkage 510 operatively connected between the door 120 and the aerodynamic structure 406, 410 allows collapsing of the side panel 406 to pull down on the top panel, thereby assisting with closing the overall structure.

Counter-Weight Assembly

Figure 6:
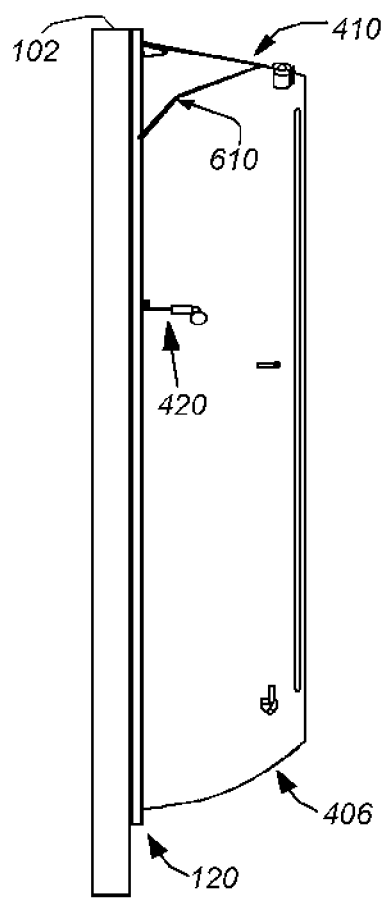
FIG. 6 is a side perspective view of a single door-mounted rear aerodynamic structure mounted in a cargo body, incorporating a counter-weight assembly to offset the upper panel, according to an illustrative embodiment.

Reference is now made to FIG. 6 showing a side perspective view of a single door-mounted structure mounted on a cargo body, incorporating a counter-weight assembly to offset the weight of the upper panel, according to an illustrative embodiment. As shown, a counter-weight system is employed to offset the weight of a top panel 410, allowing the naturally occurring pressure vacuum at the rear 120 of the trailer to lift the top panel 410 into its optimal aerodynamic position at speeds in excess of 35 miles per hour. According to one embodiment of this counter-weight, a two member linkage with a weight is added either at, or hanging from, their shared vertex 610. The vertex 610 moves down as the upper panel 410 moves upward, and the vertex 610 moves upward as the upper panel 410 moves downward. In an illustrative embodiment, the weight of the counter-weight system is similar to that of the top panel 410, to thereby create an essentially "zero-gravity" (e.g. no "sagging" of the top panel 410 from the force of gravity) top panel 410.

II) Spoiler for Top Rear End of Cargo Body

Figure 7:
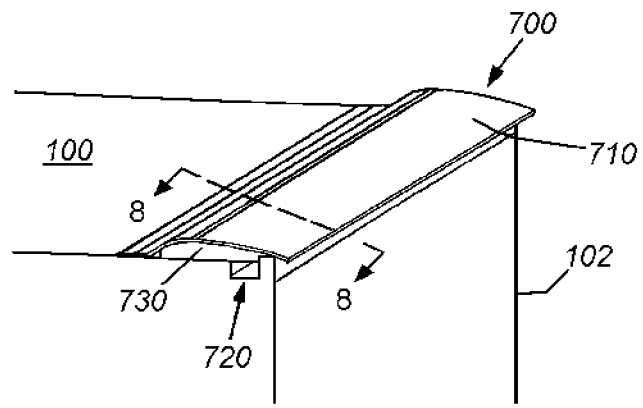
FIG. 7 is a perspective rear view of a rear spoiler aerodynamic structure mounted on a cargo body and incorporating compressible material, according to an illustrative embodiment.

According to various illustrative embodiments, a spoiler can be provided for securing to a rear top end of the cargo body. The spoiler cleans and streamlines the airflow moving along the roof of the trailer just before it exits at the rear 102. As shown in FIG. 7, the spoiler 700 includes a panel 710 having a curved shape that redirects airflow so that airflow is moving slightly downward (angle of approximately 5-35 degrees) when exiting the rear of the trailer, which reduces the wake region behind a trailer. The curved shape also covers an otherwise unaerodynamic region of trailers where many manufacturers have added a rain gutter 720. The spoiler 700 can terminate before the rear 102, at the rear frame 102, or extend beyond the rear 102. The spoiler 700 can extend below the top of the trailer 100 at its rearward point. The spoiler 700 can comprise a compressible material 730, as shown in FIGS. 7 and 8, or a spoiler 900, as shown in FIGS. 9 and 10, can comprise compressible members.

Figure 8:
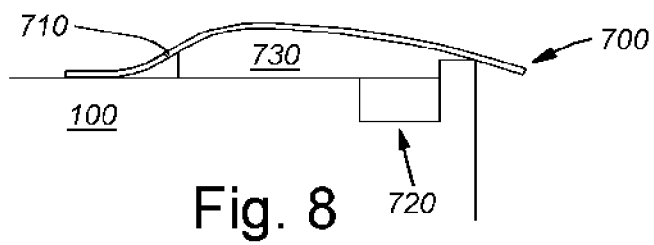
FIG. 8 is a cross-sectional view as taken through line 8-8 of FIG. 7, showing the rear spoiler secured to the cargo body, according to the illustrative embodiment.

The spoiler 700 as shown in FIGS. 7 and 8 comprises a plastic or other flexible panel 710 and a compressible material 730. The compressible material consists of foam or other compressible material known in the art. The compressible material is rigid enough to maintain a consistent spoiler shape at highway speeds, yet advantageously compresses downward towards the roof of the trailer in the event of a downward or rearward force (from a tight clearance overpass, for example). This allows the panel 710 to compress into a shape having a lower height, and spring back into position once interference has cleared. This foam material can be continuous for the entire width of the cargo body or there can be several discrete foam blocks spaced out across the width. The compressible material 730 is desirably readily cut with hand tools so as to conform to different cargo body top dimensions and configurations as appropriate.

Figure 9:
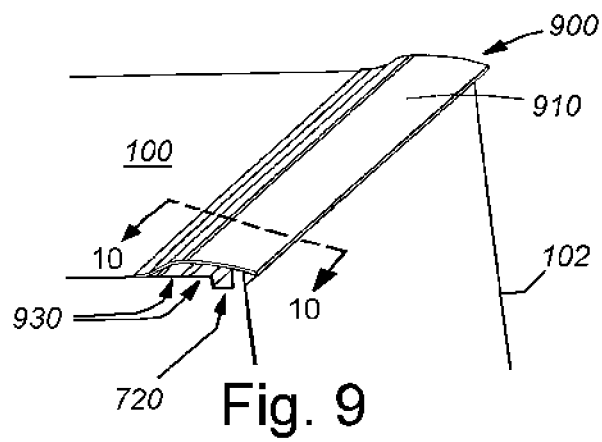
FIG. 9 is a perspective rear view of a rear spoiler aerodynamic structure mounted on a cargo body and incorporating compressible springs, according to an illustrative embodiment.
Figure 10:
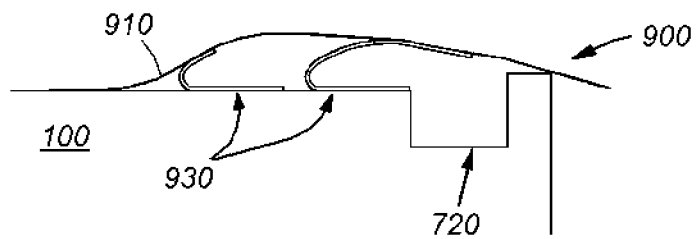
FIG. 10 is a cross-sectional view as taken through line 10-10 of FIG. 9, showing the rear spoiler secured to the cargo body, according to the illustrative embodiment.
Figure 11:
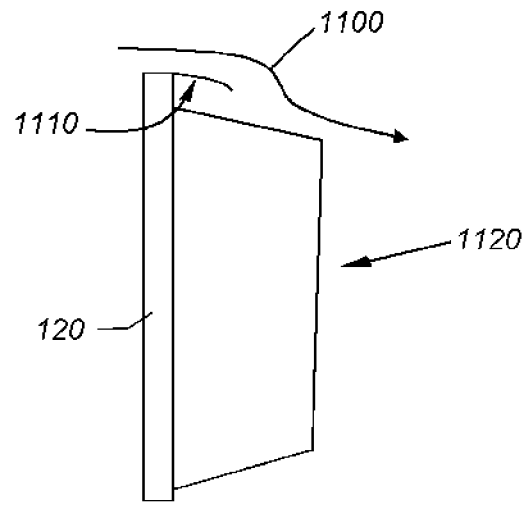
FIG. 11 is a side perspective view showing the flow of air around a rear-mounted spoiler and associated three- or four-sided aerodynamic structure in the deployed position, according to the illustrative embodiments.

A spoiler 900 shown in FIGS. 9 and 10 includes a flexible (such as plastic) panel 910 and compressible members 930. The compressible members 930 consist of metal leaf springs, hinges, or other structures that are compressible to allow for compression of the spoiler panel 910. The compressible members 930 mount directly to the roof of the cargo body at one end and are riveted to the panel 910 material at the other. These flexible connectors are rigid enough to maintain a consistent spoiler shape at highway speeds, yet rotate or compress downward towards the roof of the trailer in response to a downward or rearward force (e.g., from a tight clearance overpass). This allows the panel 910 to compress into a shape having lower clearance, and then spring back into position once the interference has cleared.

III) Rear-Mounted Aerodynamic Structure Including Upper Panel and Side Panel and Spoiler for Top Rear End of Cargo Body Both the rear-mounted aerodynamic structure including upper panel and side panel, and the spoiler for top rear end of cargo body, provide aerodynamic benefit individually. However, additional gain and efficiency is achieved when the two products are used together in combination. A three- or four-sided aerodynamic structure has a top panel beneath the top lights at the rear frame 102 of the trailer 100 or visibility and regulatory reasons. The inset of the aerodynamic structure creates an inefficient area where the flow is turbulent and not attached to the top panel of the aerodynamic structure. However, a spoiler 1110 (which can comprise spoiler 700, 900 or other equivalent structure) successfully transitions this turbulent area down onto the top panel and out past the side panel 1120, increasing the benefit of the aerodynamic structure, as shown by arrow 1100. Furthermore, the spoiler combined with the aerodynamic structure including the upper panel and side panel is particularly useful where the aerodynamic structure employs a shorter top panel, to allow for the airflow to reattach as shown by arrow 1100. The aerodynamic structure incorporating a spoiler at the top rear end can be a three- or four-sided aerodynamic structure including side panels and an upper panel, and an optional bottom panel.

IV) Cable Rigidity System for Aerodynamic Structures

Figure 12:
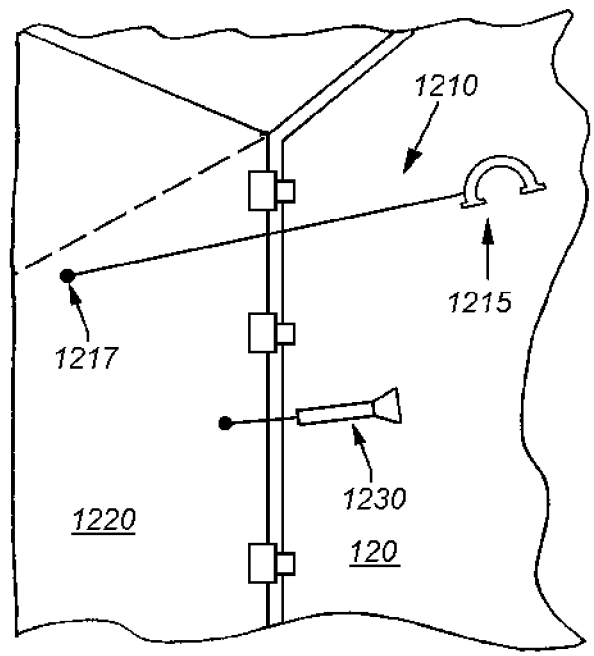
FIG. 12 is a rear partial perspective view of a top and side panel arrangement for an aerodynamic structure in the deployed position, employing a cable assembly shown in the rigid state under tension, according to an illustrative embodiment.
Figure 13A:
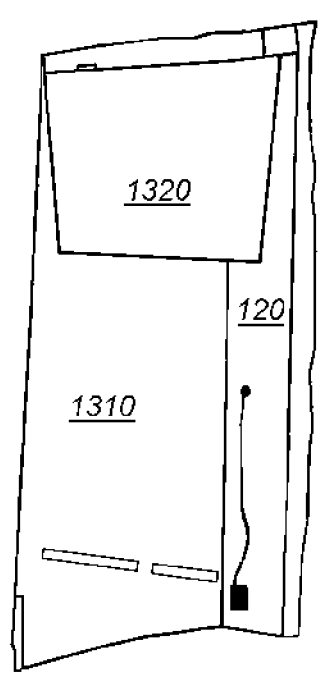
FIG. 13A is a rear partial perspective view of a top panel and side split-panel arrangement for an aerodynamic structure, shown in the collapsed position, employing the cable assembly according to the illustrative embodiment.
Figure 13B:
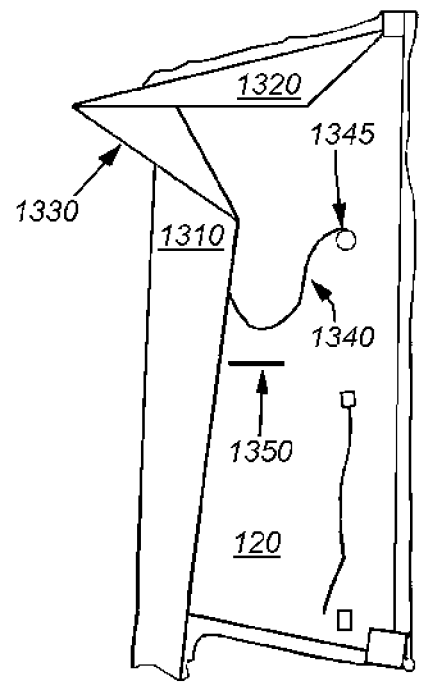
FIG. 13B is a rear partial perspective view of the top panel and side split-panel arrangement for an aerodynamic structure, shown in a partially opened position, employing the cable assembly according to the illustrative embodiment.
Figure 13C:
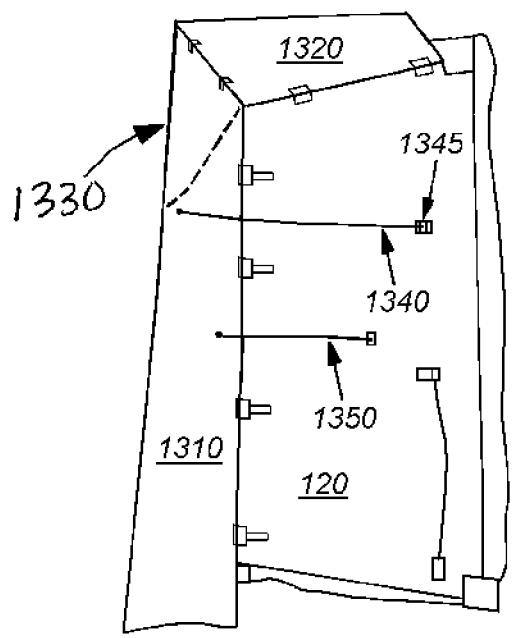
FIG. 13C is a rear partial perspective view of the top panel and side split-panel arrangement for an aerodynamic structure, shown in a fully deployed position, employing the cable assembly according to the illustrative embodiment.

Reference is now made to FIGS. 12 through 13C detailing a cable rigidity system for a three- or four-sided aerodynamic structure. According to an illustrative embodiment, FIG. 12 is a rear partial perspective view of a top and side panel arrangement for an aerodynamic structure in the deployed position, employing a cable assembly shown in the rigid state with the cable under tension. As shown, the aerodynamic structure is mounted to a door 120 of a cargo body, and a cable 1210 is provided that is secured to the door via securing element 1215 and to the side panel 1220 at securing element 1217. The cable 1210 provides a cost-effective and light-weight way to control the deployed shape of a rear-mounted aerodynamic structure and adds rigidity, without compromising the closing operation or the stack-up of the structure when in the collapsed position. The cables generally have a quick-release element 1215, such as a carabineer, at one end for ease of installation and a solid loop 1217 crimped in place at the other end for anti-theft protection. The securing elements 1215, 1217 can also comprise an eyelet, bracket or other appropriate mechanism for securing the cable to the door 120 and the side panel 1220. An actuator 1230 can also be provided for causing actuation of the side panel 1220. The panel system is arranged so that linkages and hinge structures are provided between panels so that deployment of one or more latches (on either side of the aerodynamic structure), or of the physical actuator 1230, causes all panels (top, side and the optional bottom) to deploy concurrently. The actuator 1230 is shown but need not be provided to allow for actuation of the panels, which can be achieved according to any of the variety of actuation mechanisms shown and described herein.

FIG. 13A is a rear partial perspective view of a top panel and side split-panel arrangement for an aerodynamic structure, shown in the collapsed position, employing the cable assembly according to the illustrative embodiment. The aerodynamic structure of FIGS. 13A through 13C allows for a panel system with minimal additional components and can employ a top panel having any weight. As shown in FIG. 13A, a side panel portion 1310 and top panel 1320 are hingedly secured to a door 120 of a cargo body. With further reference to FIG. 13B, showing the top panel 1320 and side split-panel arrangement 1310, 1330 in a partially opened position. The side panel 1310, 1330 is a split-panel arrangement and includes a top portion 1330 and a side panel portion 1310 that together define one side of the aerodynamic structure when fully deployed, as shown in FIG. 13C. Note that the cable 1340 is secured to the door 120 by a securing element 1345. Additionally, an actuator 1350 is provided for actuation of the side panel to define corresponding overall actuation of the aerodynamic structure. The panel system is arranged so that linkages and hinge structures are provided between the panels so that deployment of one or more panels (or latches), on either side of the aerodynamic structure, causes all panels (top, side and optionally bottom) to deploy concurrently. The arrangement of the folding seams of the side panels cause the top panel to open with only a gas spring, or other actuator (1350) connecting the trailer door 120 and the lower side panel 1310, and holding the side panel 1310 in the open position.

V) Automatically-Opening Aerodynamic Structure Employing Top Drag Tabs

In another embodiment, automatic opening or deployment of the doors, under bias of the actuator, can be provided using a top-mounted or side-mounted pivoting tab structure, that causes a latch cable or other switching device to be released when the tab pivots in response to drag/wind resistance at a predetermined travel speed. This allows for non-deployment at low speeds (e.g. city driving, where the extra length could be problematic), while higher (e.g., highway) speeds cause deployment of the aerodynamic structure. The tab is operatively connected by, illustratively, a cable assembly that is secured to a latch or an aerodynamic panel. When the actuator biases the panel outwardly, it tensions the cable, causing the tab to pivot back into a low-drag configuration.

Figure 14A:
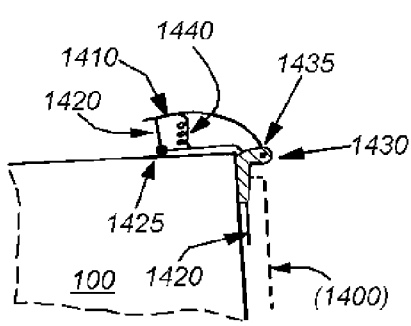
FIG. 14A is a partial side cross-sectional view of an automatically opening aerodynamic structure assembly employing a top drag tab, according to an illustrative embodiment, showing the top drag tab arrangement when the aerodynamic structure is in the collapsed position.

FIG. 14A is a partial side cross-sectional view of an automatically opening aerodynamic structure assembly employing a pivoting top drag tab, according to an illustrative embodiment, showing the top drag tab arrangement when the side panel 1400 of the aerodynamic structure is in the collapsed position. The automatically opening aerodynamic structure is achieved by the top drag tabs, which provide an independent latch system to automatically release the panels at a particular speed. The top drag tab 1410 is a rotating piece of material mounted to a top of the trailer door of the cargo body 100. A cable assembly 1420 is operatively connected between the top drag tab 1410 and the side panel 1400, and the cable 1420 passes through an eyelet 1425, which can comprise a pulley or other appropriate element for allowing the cable to pass therethrough.

Figure 15A:
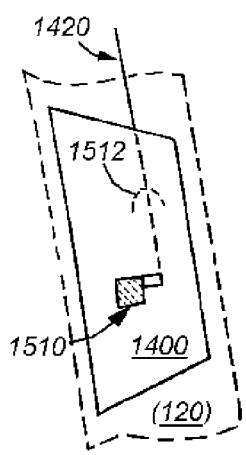
FIG. 15A is a partial rear perspective view of a side panel collapsed against a door and including a top drag tab latch and associated cable assembly mounted to an inside of the panel, according to an illustrative embodiment.

As shown in FIG. 15A, the top drag tab 1410 is connected to a latch 1510 via a cable 1420, which runs from the latch 1510 of the panel through a securing element 1512 and to a fixed point above the trailer, then around the upper rear of the trailer and back toward the rear of the trailer to the tab. In accordance with the illustrative embodiment, the tab components and cables are mounted to the trailer door itself in a cantilevered position. This allows free rotation of the trailer doors (with tab components) at loading docks. The hinge 1430 is hingedly attached to a forward edge of the top drag tab 1410. The top drag tab 1410 is biased slightly outward away from the cargo body 100 by a spring 1440, or other appropriate biasing member. Thus, the top drag tab 1410 is biased slightly away from the top of the cargo body when the aerodynamic structure is collapsed and the cargo body is stopped or below a critical speed.

Figure 14B:
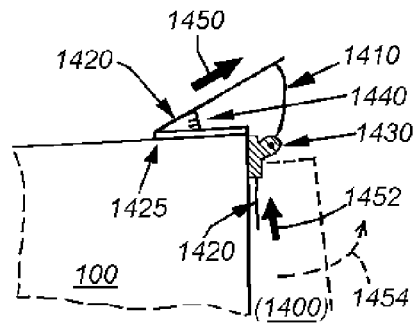
FIG. 14B is a partial side cross-sectional view of the automatically opening aerodynamic structure assembly employing the top drag tab, according to the illustrative embodiment, showing the top drag tab arrangement when the cargo body has reached a sufficient speed to cause the aerodynamic structure to start to open into the deployed position by the cable assembly actuating the latch and causing the actuator to deploy the panel structure.
Figure 14C:
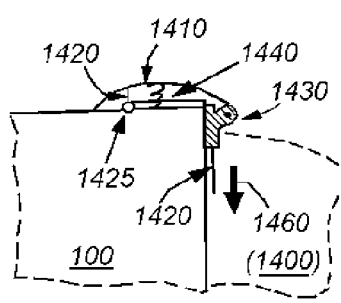
FIG. 14C is a partial side cross-sectional view of the automatically opening aerodynamic structure assembly employing the top drag tab, showing the top drag tab arrangement when the aerodynamic structure has opened to the fully deployed position with the top drag tab forced downwardly in a low drag, close-conforming profile on the cargo body, according to the illustrative embodiment.
Figure 15B:
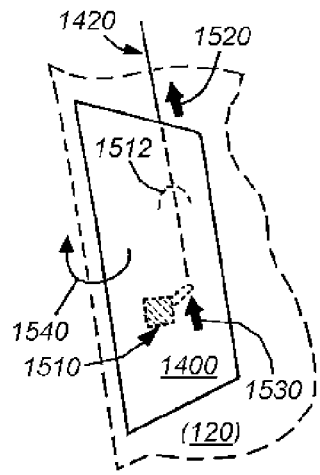
FIG. 15B is a partial rear perspective view of the side panel being released by the top drag tab latch and associated cable assembly to cause the aerodynamic structure to open towards the deployed position, according to the illustrative embodiment.

Referring to FIGS. 14B and 15B, showing respectively a partial side cross-sectional view of the top drag tab and a rear perspective view of the side panel, as the cargo body has reached a sufficient speed to cause the aerodynamic structure to start to open into the deployed position via the cable assembly actuating the latch. As shown in FIG. 14B, the drag on the top drag tab 1410 causes the tab to pivot to the position shown in FIG. 14B, and the cable assembly moves in the direction of arrow 1450, thereby causing the opposite end of the cable 1420 to move upwardly in the direction of arrow 1452. This concurrently causes the latch 1510 to release (arrows 1520 and 1530 of FIG. 15B) which causes the side panel 1400 to commence to swing outwardly (arrow 1454 of FIG. 14B and arrow 1540 of FIG. 15B). As the side panel 1400 swings outwardly, this increases the tension on the cable 1420, as shown by arrow 1460 of FIG. 14C, which overpowers the drag force exerted on the top drag tab 1410 and cause it to collapse to the roof of the cargo body. When the aerodynamic structure is fully deployed, the top drag tab 1410 is pulled completely down, compressing the spring 1440. When the spring 1440 is fully compressed, the top drag tab 1410 lies flush with the top plane of the cargo body in an aerodynamic orientation, allowing air to flow smoothly over the top of the drag tab 1410 and down onto the rear aerodynamic structure. The tension further ensures that the panels are maintained in an open deployment.

Figure 15C:
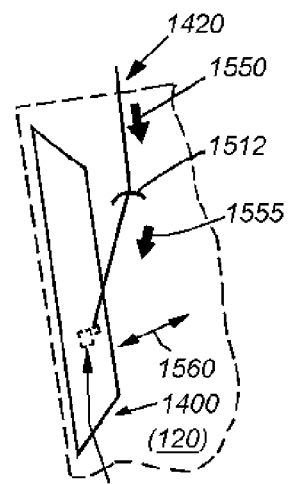
FIG. 15C is a partial rear perspective view of the side panel shown in the deployed position as fully deployed by the actuator, as tension from the cable assembly biases the tab downward to a low drag, close-conforming profile, according to the illustrative embodiment.

As shown in FIG. 15C, the tension of the cable 1420, shown by arrows 1550 and 1555, causes the side panel 1400 to open, for example by an actuator 1560. The actuation can also be performed with an electric solenoid system having contacts on the tab and actuators on the latch that sense movement to cause opening of the aerodynamic structure. The panel systems described herein are arranged so that linkages and hinge structures are provided between the panels so that deployment of one or more latches (i.e. on either side) causes all panels (top, side and optional bottom) to deploy concurrently.

VI) Automatically-Opening Aerodynamic Structure Employing Side Drag Tabs

Reference is now made to FIGS. 16A through 18C, showing an automatically-opening structure employing side drag tabs that provide an independent latch to automatically release the aerodynamic structure at a particular speed. FIG. 16A is a partial top cross-sectional view of an automatically opening aerodynamic structure assembly employing a side drag tab, according to an illustrative embodiment, showing the side drag tab arrangement when the aerodynamic structure is in the collapsed position. The automatically opening aerodynamic structure is achieved by the side drag tabs, which provide an independent latch system to automatically release the panels at a particular speed. The side drag tab 1610 is a rotating piece of material mounted in a position outward from the side of the cargo body 100. A cable assembly 1620 is operatively connected between the side drag tab 1610 and the side panel (1700 in FIG. 17A), and the cable 1620 passes through an eyelet 1625, which can comprise a pulley or other appropriate element for allowing the cable to pass therethrough. As shown in FIG. 17A, the side drag tab 1610 is connected to a latch 1710 via a cable 1620, which runs from the latch 1710 of the panel through a securing element 1712 and to a fixed point above the trailer, then around the upper rear of the trailer and back toward the rear of the trailer to the tab. In an illustrative embodiment, the cable runs from the side drag tab to a fixed point on the side of the trailer, then around the rear side of the trailer, and across the rear of the trailer to a latch on the inside of the lateral panel. The latch on the inside of the lateral panel can be a push-to-close latch or other manually or automatically actuable latches. The latch on the interior of the side panel allows the actuator to deploy from the undeployed position, when folded against the door, to the fully deployed position. The hinge 1630 is hingedly attached to a forward edge of the side drag tab 1610. The side drag tab 1610 is biased slightly outward away from the cargo body 100 by a spring 1640, or other appropriate biasing member. Thus, the side drag tab 1610 is biased slightly away from the side of the cargo body when the aerodynamic structure is collapsed and the cargo body is stopped or below a critical speed. As shown in FIGS. 16B and 17B, showing respectively a partial top cross-sectional view of the side drag tab and a rear perspective view of the side panel, as the cargo body has reached a sufficient speed to cause the aerodynamic structure to start to open into the deployed position via the cable assembly actuating the latch. As shown in FIG. 16B, the drag on the side drag tab 1610 causes the tab to move to the position shown in FIG. 16B, and the cable assembly moves in the direction of arrow 1650, thereby causing the opposite end of the cable 1620 to move upwardly in the direction of arrow 1652. This concurrently causes the latch 1710 to release (arrow 1730 of FIG. 17B) which causes the side panel 1700 to commence to swing outwardly (arrow 1740 of FIG. 17B). As the side panel 1700 swings outwardly, this increases the tension on the cable 1620, as shown by arrow 1660 of FIG. 16C, which overpowers the drag force exerted on the side drag tab 1610 and causes it to collapse to the roof of the cargo body. When the aerodynamic structure is fully deployed, the side drag tab 1610 is pulled completely down, compressing the spring 1640. When the spring 1640 is fully compressed, the side drag tab 1610 lies flush with the side plane of the cargo body in an aerodynamic orientation, allowing air to flow smoothly over the side drag tab 1610 and onto the rear aerodynamic structure. The tension further ensures that the panels are maintained in an open deployment. As shown in FIG. 17C, the tension of the cable 1620 causes the side panel 1700 to open.

Reference is made to FIGS. 18A through 19 showing top cross-sectional views of a cable routing assembly for maintaining height of the cable assembly, showing a side drag tab arrangement. FIG. 18A is a top cross-sectional view of a cable routing assembly for maintaining height of the cable assembly, showing a side drag tab arrangement when the aerodynamic structure in the collapsed position, according to an illustrative embodiment, with FIG. 18B showing the aerodynamic structure as it starts to open into the deployed position, and FIG. 19 showing the aerodynamic structure in the fully deployed position. The cable routing arrangement shown in FIGS. 18A through 19 show a side panel 1800 operatively connected by a securing element 1805 to a cable 1820 that is secured to a side drag tab 1810 through the cable 1820 as secured to the body of the truck at 1825. As the side drag tab 1810 moves outward, and the cable 1820 moves as shown by arrow 1830, this causes the side panel 1800 to move toward the deployed position, as shown by arrow 1834 of FIG. 18B. As shown in FIG. 19, once the side panel 1800 is fully deployed, the force (arrow 1840) exerted on the cable 1820 causes the side drag tab 1820 to be drawn inwardly toward the cargo body. The cable arrangement 1820 allows the cable to be maintained at a constant height above the ground at all times.

VII) Automatically-Opening Aerodynamic Structure Employing Top Drag Spoiler

Figure 20A:
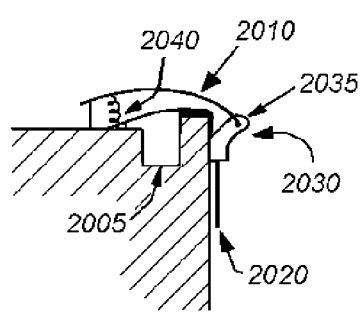
FIG. 20A is a partial side cross-sectional view of an automatically opening aerodynamic structure assembly employing a top drag spoiler, according to an illustrative embodiment, showing the top drag spoiler arrangement when the aerodynamic structure is in the collapsed position.
Figure 20B:
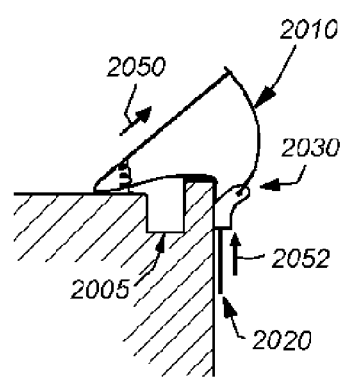
FIG. 20B is a partial side cross-sectional view of the automatically opening aerodynamic structure assembly employing the top drag spoiler, according to the illustrative embodiment, showing the top drag spoiler arrangement when the cargo body has reached a sufficient speed to cause the aerodynamic structure to start to open into the deployed position by the cable assembly actuating the latch and causing the actuator to deploy the panel structure.
Figure 20C:
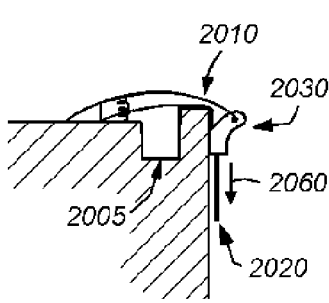
FIG. 20C is a partial side cross-sectional view of the automatically opening aerodynamic structure assembly employing the top drag spoiler, showing the top drag spoiler arrangement when the aerodynamic structure has opened to the fully deployed position with the top drag spoiler forced downwardly in a low drag, close-conforming profile on the cargo body, according to the illustrative embodiment.

Reference is now made to FIGS. 20A through 20C showing a partial side cross-sectional view of a top drag spoiler for an automatically-opening aerodynamic structure. FIG. 20A shows the top drag spoiler arrangement when the aerodynamic structure is in the collapsed position, and includes a top drag spoiler 2010 that runs the entire width of the trailer, in an illustrative embodiment. The cargo body includes a rain gutter 2005 and the cable assembly 2020 runs from the door, through the latch 2030 and up to the top drag spoiler 2010. The top drag spoiler 2010 is hingedly secured to the latch 2030. A spring 2040 biases the top drag spoiler 2010 slightly upward so that the top drag spoiler 2010 catches air during movement of the cargo body, to cause the top drag spoiler 2010 to move upwardly, to the position as shown in FIG. 20B. As shown, the top drag spoiler 2010 moves upward in the airflow, and the cable assembly 2020 moves upwardly, in the direction of arrow 2050, which in turn causes the opposing end of the cable assembly 2020 to move upwardly in the direction of arrow 2052, as the cargo body commences motion and there is sufficient airflow to cause the top drag spoiler 2010 to move into the position shown in FIG. 20B, thereby causing the actuator to deploy the panel structure. Illustratively, once the latch has released the aerodynamic structure, there is a significant amount of force exerted on the cable assembly 2020, in the direction of arrow 2060. This causes the top drag spoiler 2010 to be drawn downward in a low drag, close-conforming profile on the cargo body, as shown in FIG. 20C.

Figure 21A:
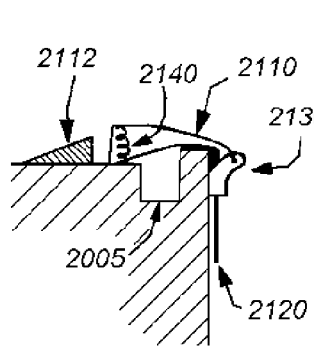
FIG. 21A is a partial side cross-sectional view of an automatically opening aerodynamic structure assembly employing a top segmented spoiler, according to an illustrative embodiment, showing the top segmented spoiler arrangement when the aerodynamic structure is in the collapsed position.
Figure 21B:
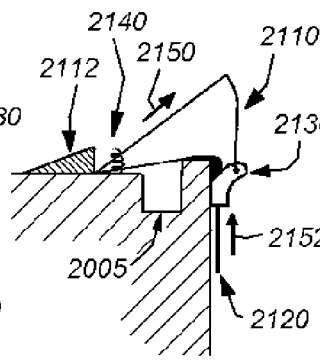
FIG. 21B is a partial side cross-sectional view of the automatically opening aerodynamic structure assembly employing the top segmented spoiler, according to the illustrative embodiment, showing the top segmented spoiler arrangement when the cargo body has reached a sufficient speed to cause the aerodynamic structure to start to open into the deployed position by the cable assembly actuating the latch and causing the actuator to deploy the panel structure.
Figure 21C:
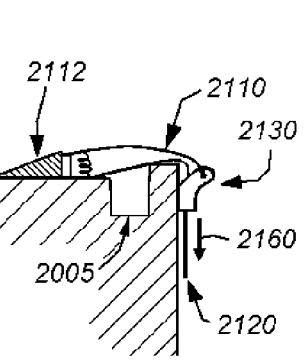
FIG. 21C is a partial side cross-sectional view of the automatically opening aerodynamic structure assembly employing the top segmented spoiler, showing the top segmented spoiler arrangement when the aerodynamic structure has opened to the fully deployed position with the top segmented spoiler forced downwardly in a low drag, close-conforming profile on the cargo body, according to the illustrative embodiment

VIII) Automatically-Opening Aerodynamic Structure Employing Top Segmented Spoiler A partial side cross-sectional view of an automatically opening aerodynamic structure employing a top segmented spoiler is shown in FIGS. 21A through 21C. The top segmented spoiler includes a top drag spoiler 2110 and a front segment 2112 that is permanently or semi-permanently mounted to the roof of the cargo body that together define the overall top segmented spoiler. The top segmented spoiler arrangement allows for an automatically-opening aerodynamic structure through the use of the top spoiler 2110 operatively connected through the cable assembly 2120 to the aerodynamic structure latch 2130. A spring 2140, or other appropriate biasing element, biases the top spoiler 2110 upward, away from the cargo body, such that airflow catches the top spoiler 2110 and causes it to move upwardly to the position shown in FIG. 21B, once the cargo body is traveling at a sufficient speed. The top drag spoiler 2110 moves upwardly, causing the cable assembly 2120 to move in the direction of arrow 2150, which in turn causes the cable 2120 to move in the direction of arrow 2152. This causes the latch 2130 to release, which thereby releases the aerodynamic structure. Once the aerodynamic structure is fully deployed, this causes force to be exerted on the cable assembly 2120, in the direction of arrow 2160, which draws the top spoiler 2110 down into a low draw, close-conforming profile on the cargo body, according to the illustrative embodiment.

IX) Upward-Folding Origami

Figure 22:
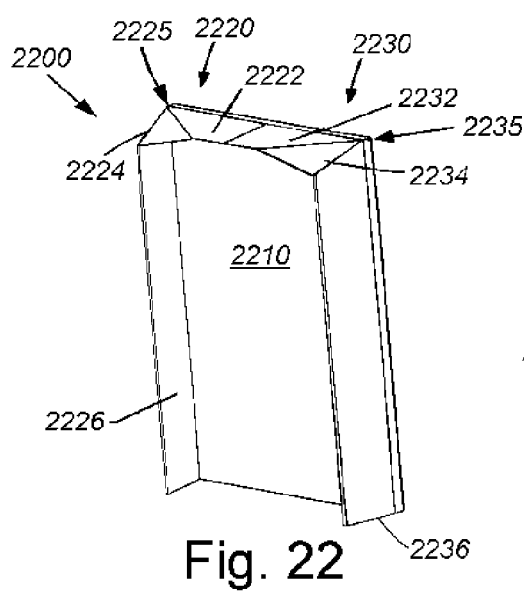
FIG. 22 is a rear perspective view of an upward-folding origami panel arrangement, shown in the deployed position, in accordance with an illustrative embodiment
Figure 23:
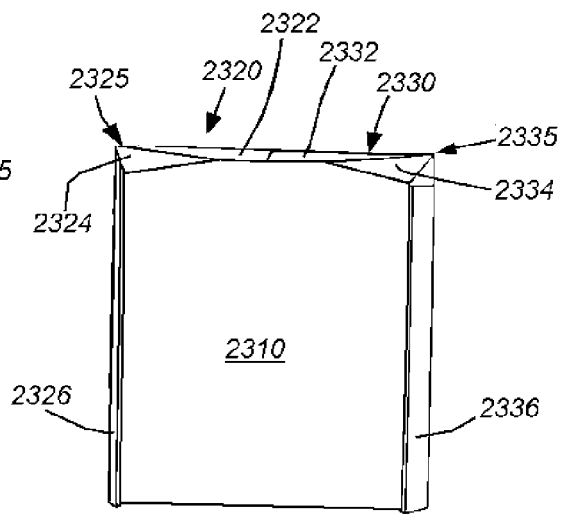
FIG. 23 is a rear perspective view of the upward-folding origami panel arrangement of FIG. 22, shown in the deployed position, in accordance with an illustrative embodiment.
Figure 24:
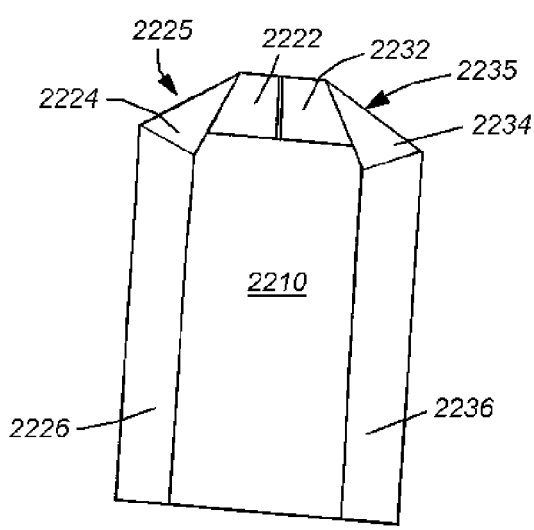
FIG. 24 is a rear perspective view of the upward-folding origami panel arrangement of FIG. 22, showing the panel arrangement in the collapsed or retracted position, in accordance with the illustrative embodiment.

Reference is made to FIGS. 22 to 24 showing various illustrative embodiments for a three-sided device in which the upper panel is an upward-folding origami arrangement to afford minimal "stack-up" (i.e. stacking of the upper panel and/or side panel when folded). FIG. 22 is a rear perspective view of an upward-folding origami panel arrangement, shown in the deployed position, in accordance with an illustrative embodiment. With reference to FIG. 22, a three-sided aerodynamic structure 2200 is shown, secured to a trailer 2210. The aerodynamic structure 2200 includes an left upper panel assembly 2220 on one side and a right upper panel assembly 2230 on the other side. Although two separate assemblies are shown and described, with each assembly being mounted to its respective rear door, it is also contemplated that a single upper panel assembly can be employed. The left upper panel assembly comprises a first panel portion 2222 and a second panel portion 2224, which are bisected along line 2225 to allow for appropriate folding of the panels. The first panel portion 2222 is secured (pivotally, by a hinge, or other appropriate mechanisms shown herein and others known in the art) to the trailer 2210 on one side and to the second panel portion 2224 at the hinge line 2225. The second panel portion 2224 is secured to the side panel 2226. Likewise, the right upper panel assembly 2230 comprises a first panel portion 2232 and a second panel portion 2234, which are bisected along line 2235 to allow for appropriate folding of the panels. The first panel portion 2232 is secured (either pivotally, by a hinge, or other appropriate mechanisms shown herein and others known in the art) to the trailer 2210 on one side and to the second panel portion 2234 at the hinge line 2235. The second panel portion 2234 is secured to the side panel 2236, to thereby define the aerodynamic structure 2200.

Referring to FIG. 23, a rear perspective view of the upward-folding origami panel, the aerodynamic structure 2300 is shown in the deployed position as secured to a trailer 2310, and includes an left upper panel assembly 2320 on one side and a right upper panel assembly 2330 on the other side. It is also contemplated that a single upper panel assembly can be employed, but for illustrative purposes, two separate assemblies are shown and described. The left upper panel assembly comprises a first panel portion 2322 and a second panel portion 2324, which are bisected along line 2325 to allow for appropriate folding of the panels. The first panel portion 2322 is secured (pivotally, by a hinge, or other appropriate mechanisms shown herein and others known in the art) to the trailer 2310 on one side and to the second panel portion 2324 at the hinge line 2325. The second panel portion 2324 is secured to the side panel 2326. Likewise, the right upper panel assembly 2330 comprises a first panel portion 2332 and a second panel portion 2334, which are bisected along line 2335 to allow for appropriate folding of the panels. The first panel portion 2332 is secured (either pivotally, by a hinge, or other appropriate mechanisms shown herein and others known in the art) to the trailer 2310 on one side and to the second panel portion 2334 at the hinge line 2335. The second panel portion 2334 is secured to the side panel 2336, to thereby define the aerodynamic structure 2300.

Figure 25:
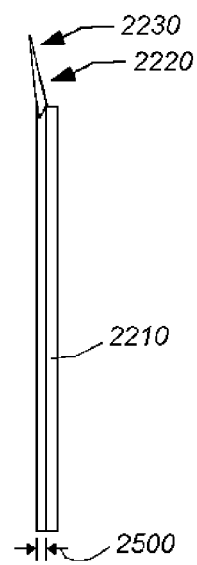
FIG. 25 is a side perspective view of the upward-folding origami panel of FIG. 22, showing the panel arrangement in the collapsed position, in accordance with the illustrative embodiment.

Reference is now made to FIG. 24 showing a rear perspective view of the upward-folding origami panel arrangement of FIG. 22, showing the panel arrangement in the collapsed or retracted position, in accordance with the illustrative embodiment. As shown, the panel has folded into the collapsed position with the upper panels folding, respectively, along lines 2225 and 2235. Referring to FIG. 25, a side perspective view of the upward-folding origami panel of FIG. 22 is shown with the panel arrangement in the collapsed position, in accordance with the illustrative embodiment. As shown, the collapsed orientation allows for minimal "stack-up" 2500, which is the distance that the aerodynamic structure protrudes beyond the end of the trailer 2210. In this instance, as shown, the upward-folding origami affords less stack-up thickness 2500 when in the collapsed position due to top panels not overlapping the lateral (side) panel when folded. This is particularly useful in environments where trailers may have less room between the trailer door and the side of the trailer when loading and/or unloading.

The upward-folding origami does not need additional rigidity mechanisms (other than securing the lateral panel in the deployed state) because the folding configuration of the top panels prevents them from sagging due to gravity. Thus, the upward-folding origami folding configuration is constructed and arranged to ensure that the top panel arrangement is biased upward when collapsed. The aerodynamic structure 2200 is still able to be folded automatically when the trailer door is swung around the side of the trailer. Thus, the driver (or other operator of the doors) would not need to manually do any additional efforts to load or unload contents of the cargo body.

In further embodiments, cables can be provided for rigidity of the panels, additionally spring-loaded hinges and/or an actuator (i.e. a gas spring) can be employed between the trailer door and the top panel and/or lateral (side) panel to ensure proper opening and on-road rigidity. The materials can comprise a wide variety of materials, including rigid metals, composites using metal skins and plastic cores, flexible plastic composites, stretched fabric on a rigid frame, and other materials and arrangement of components known in the art.

X) Cantilevered Top Panel Hinges

Figure 26:
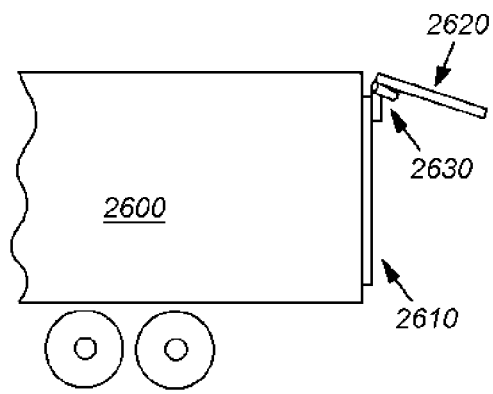
FIG. 26 is a side view of a top panel having a cantilevered hinge, shown in the deployed position, according to an illustrative embodiment.
Figure 27:
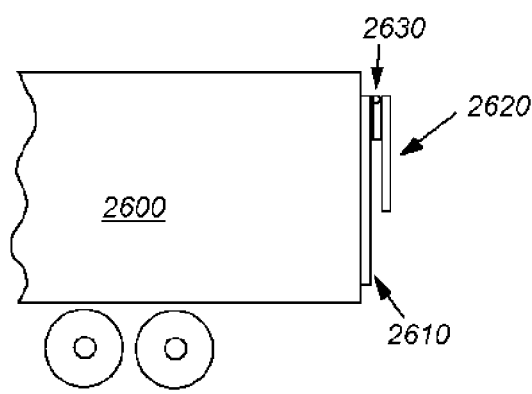
FIG. 27 is a side view of the top panel having the cantilevered hinge of FIG. 26, shown in the collapsed position, according to the illustrative embodiment.
Figure 28:
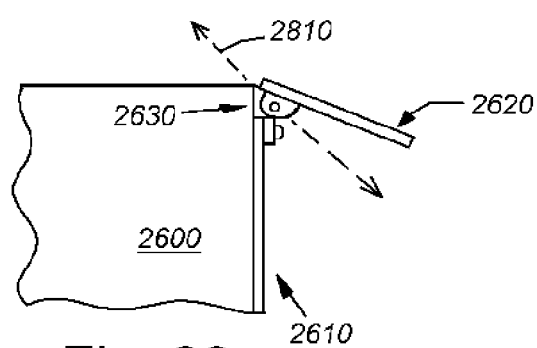
FIG. 28 is a side view of the cantilevered hinge in greater detail, in accordance with the illustrative embodiment.

Reference is made to FIGS. 26 to 28, showing various illustrative embodiments for top panel hinges that are fastened to the trailer door and which have hinge rolls (i.e. axes of rotation) cantilevered out above the trailer doors. FIG. 26 is a side view of a top panel having a cantilevered hinge, shown in the deployed position, according to an illustrative embodiment. The trailer 2600 has a door 2610 with a top panel 2620 fastened thereto by a cantilevered hinge 2630. This arrangement, as shown in FIG. 26, allows the top panel 2620 to be located flush with the top of the trailer 2600 when in the deployed state. Additionally, securing the top panel 2620 directly to the trailer door 2610 allows the top panel 2620 to move around the side of the trailer 2600 along with the trailer door 2610. With reference to FIG. 27, a side view of the top panel having the cantilevered hinge of FIG. 26 is shown in the collapsed position, according to the illustrative embodiment. The cantilevered hinge 2630 is proximate the top edge of the trailer 2600 and above the trailer door 2610. As shown in FIG. 28, the cantilevered hinge is illustrated in greater detail, in accordance with the illustrative embodiment. The cantilevered hinge 2630 has an axis of rotation 2810 that is cantilevered out above the trailer door 2610 to allow for the top panel to be flush with the top of the trailer 2600 when in the deployed state, and also to move with the trailer door when in the collapsed state.

XI) Dual-Axis Trailer Door Hinges

Figure 29:
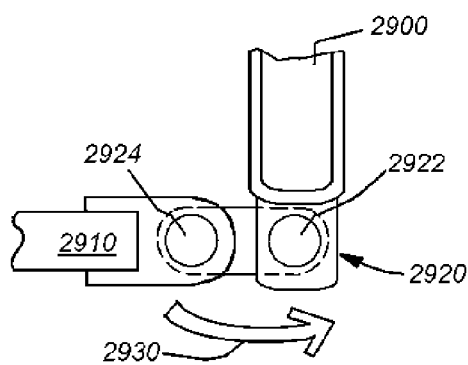
FIG. 29 is a top view of a dual-axis trailer door hinge that latches the trailer door to the rear frame, shown in the driving or closed position, in accordance with an illustrative embodiment.
Figure 30:
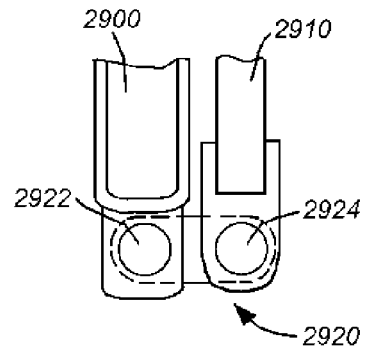
FIG. 30 is a top view of the dual-axis door hinge that latches the trailer door to the rear frame, shown in the open position, with the door folded around the side of the trailer and minimal clearance between said trailer side and door, in accordance with the illustrative embodiment.

Referring to FIGS. 29-32, various illustrative embodiments are shown for dual-axis trailer door hinges. FIG. 29 is a top view of a dual-axis trailer door hinge that latches the trailer door to the rear frame, shown in the driving or closed position, in accordance with an illustrative embodiment. As shown, the trailer 2900 has a door 2910 secured thereto by the dual-axis trailer door hinge 2920. The dual-axis hinge has a first axis 2922 and a second axis 2924, such that rotation of the door in the direction of arrow 2930 causes the trailer door to be folded around the side of the trailer, as shown in FIG. 30. Once in the open position of FIG. 30, the trailer door is folded around the side of the trailer to allow access to the contents of the trailer 2900.

Extra Stack-Up Dual-Axis Hinge

Figure 31:
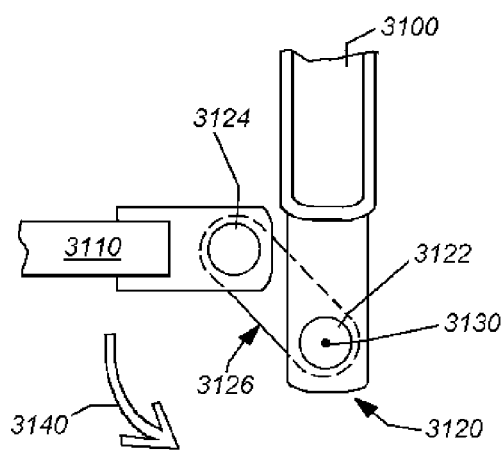
FIG. 31 is a top view of a dual-axis trailer door hinge having extra stack-up that latches the trailer door to the rear frame, shown in the driving or closed position, in accordance with an illustrative embodiment.
Figure 32:
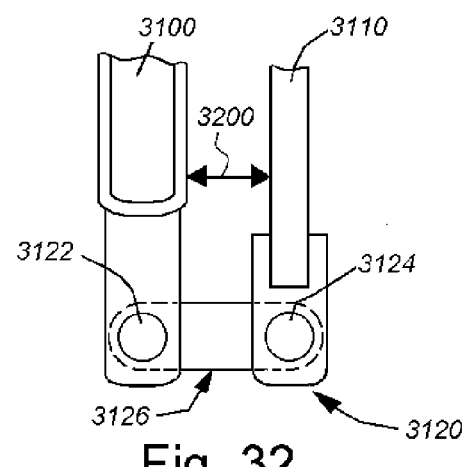
FIG. 32 is a top view of the dual-axis trailer door hinge having extra stack-up that latches the trailer door to the rear frame, shown in the open position, with the door folded around the side of the trailer and additional clearance between said trailer side and door, in accordance with the illustrative embodiment.

FIGS. 31 and 32 illustrate, respectively, a dual-axis trailer door hinge having extra stack-up that latches the trailer door to the rear frame, shown in the driving (or closed) position and in the folded (or open) position, in accordance with an illustrative embodiment. As shown, the trailer 3100 has a door 3110 secured thereto through an "extra stack-up" dual-axis hinge 3120. The extra stack-up dual-axis hinge has a first axis 3122 and a second axis 3124, with the first axis 3122 being disposed further away from the end of the trailer 3100 and including a diagonal link 3126 to the door hinge at axis 3124. Accordingly, when an aerodynamic structure is secured to the door, when the door is swung around the trailer body (as shown by the arrow 3140 in FIG. 31), the door moves to the "open" position shown in FIG. 32. As shown, this allows for extra stack-up 3200 between the trailer 3100 and the door 3110 when the door is folded around the side of the trailer.

XII) Top Panel "Crash" Bar

Figure 33:
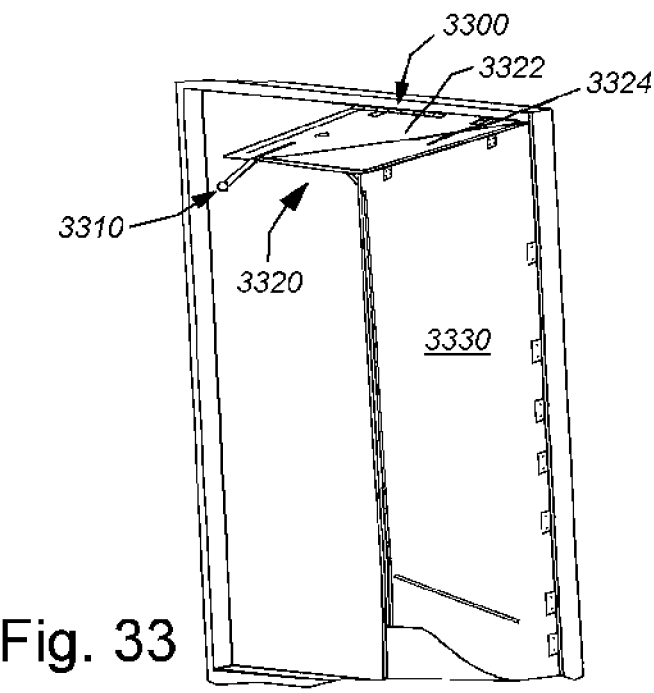
FIG. 33 is a rear perspective view of a top panel and side panel arrangement including a top panel "crash" bar, in accordance with an illustrative embodiment.
Figure 34:
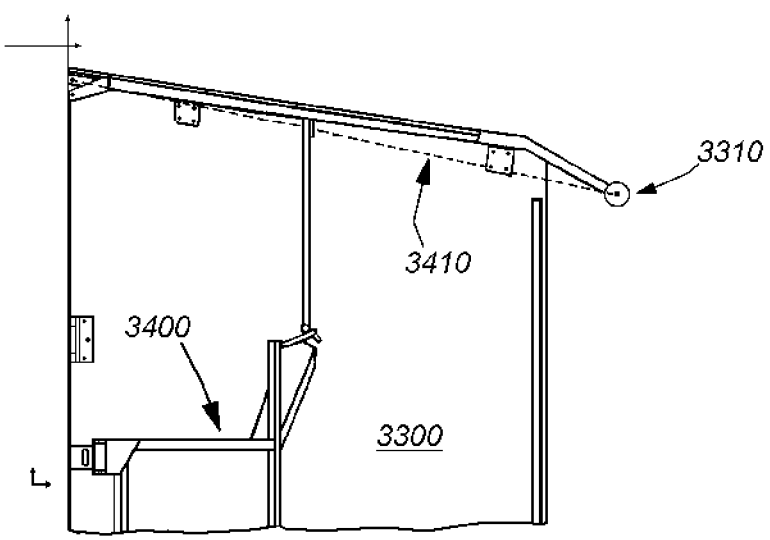
FIG. 34 is a side partial perspective view of the top panel crash bar, as shown secured to the swing arm assembly, in accordance with an illustrative embodiment.
Figure 35:
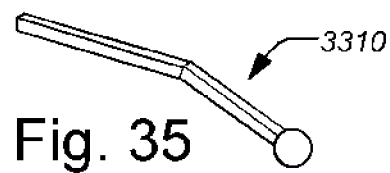
FIG. 35 is a perspective view of the crash bar in greater detail, in accordance with the illustrative embodiment.

Reference is now made to FIGS. 33 to 35 detailing a top panel "crash" bar, in accordance with an illustrative embodiment. The "crash" bar is a bar or other element that can be secured to the aerodynamic structure to prevent a "crash" or other incident when making unwanted contact between the aerodynamic structure and another object. FIG. 33 is a rear perspective view of a top panel and side panel arrangement including a top panel "crash" bar, in accordance with an illustrative embodiment. As shown, the aerodynamic assembly is secured to the trailer frame 3300 and the top panel assembly includes a crash bar 3310. The aerodynamic structure includes an upper panel 3320 that includes a first panel portion 3322 and a second panel portion 3324, and a side (lateral) panel 3330. The top panel illustratively includes a crash bar 3310 secured thereto that extends out to become the most trailing point on the device when deployed. In an impact with a wall, loading dock, or other object, the point of contact on this top panel bar creates a more significant angular force to fold the top panel closed. Additionally, this vastly reduces the occurrence of panels getting caught open and damaged in a collision. The crash bar is constructed and arranged to ensure that it does not interfere with the trailer door when the top panel is folded closed. FIG. 34 is a side partial perspective view of the top panel crash bar 3310, as shown secured at one point to the swing arm assembly 3400, in accordance with an illustrative embodiment. The dashed line 3410 denotes the location of the outer face of the trailer door when the top panel has been moved into its collapsed position. The crash bar will contact, but not interfere with, the trailer door in this state. The crash bar itself is shown in greater detail in FIG. 35. Additional crash improvements can be realized by using a spring-loaded crash bar that can rotate away from the trailer door (until it becomes parallel with the top panel) but cannot rotate towards the trailer door (it still acts as a rigid member during a collision). Additionally, although the crash bar is shown secured to the top panel, it can likewise be secured through the side panel and/or the linkage assembly or swing arm alone, to provide desired crash resistance.

XIII) Origami Aerodynamic Structure with Spring-Loaded Hinges

Figure 36:
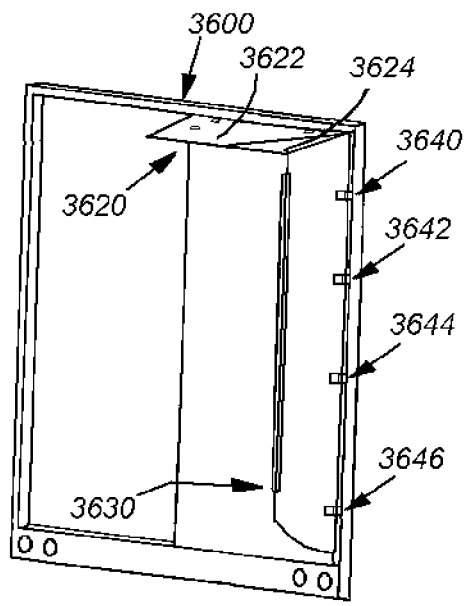
FIG. 36 is a rear perspective view of a top panel and side panel aerodynamic structure, including spring-loaded, low profile hinges, showing the aerodynamic structure in the deployed position, in accordance with an illustrative embodiment.
Figure 37:
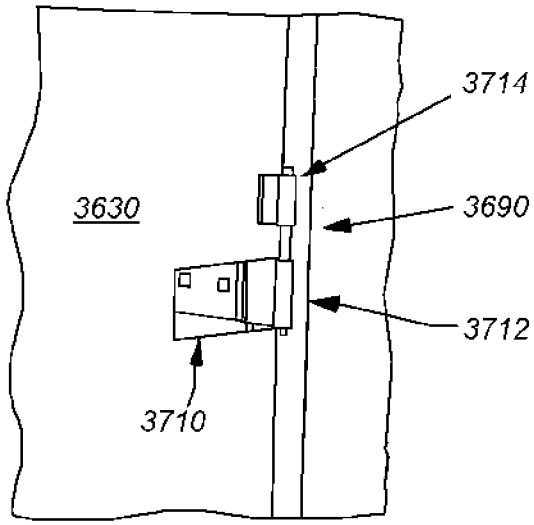
FIG. 37 is a detailed view of the low profile hinges, with the aerodynamic structure shown in the deployed position, in accordance with an illustrative embodiment.
Figure 38:
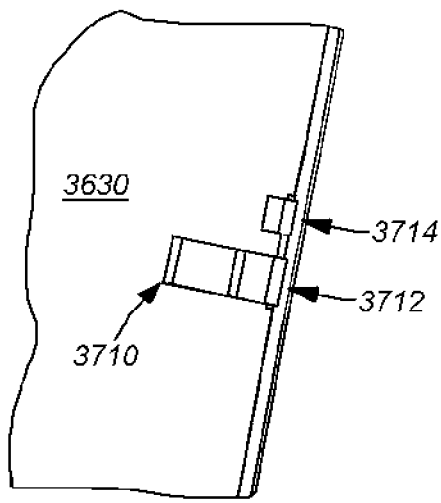
FIG. 38 is a detailed view of the low profile hinges, with the aerodynamic structure shown in the collapsed position, in accordance with the illustrative embodiment.
Figure 39:
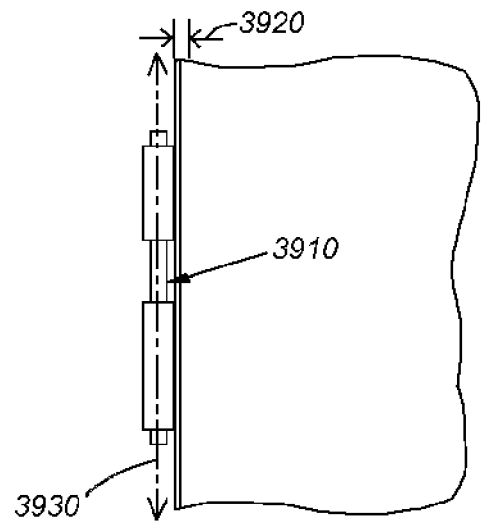
FIG. 39 is a side view of the side panel folded against the door in the collapsed position, in accordance with the illustrative embodiment.

Reference is now made to FIGS. 36 through 39 detailing various illustrative embodiments for the origami aerodynamic structure having spring-loaded hinges, in accordance with an illustrative embodiment. FIG. 36 is a rear perspective view of a top panel and side panel aerodynamic structure, including spring-loaded hinges, showing the aerodynamic structure in the deployed position. A trailer 3600 includes a door 3610 having the top panel assembly 3620 and lateral (side) panel 3630. The top panel assembly 3620 includes a first top panel portion 3622 and a second top panel portion 3624 that allow for origami-type folding of the top panel of the aerodynamic structure. As shown in FIG. 36, a plurality of hinge assemblies 3640, 3642, 3644, 3646 are shown. These bi-directional spring-loaded hinges can be used along the lateral panel and/or the top panel seams. The hinges are biased to hold the panels in their deployed state (as shown in FIG. 36), but permit inward-folding when the trailer door is opened and the side of the trailer contacts the lateral panel and pushes it inward. With reference to FIG. 37, a detailed view of the hinges, with the aerodynamic structure shown in the deployed position, is shown. The hinge assembly 3640 includes a first-directional spring 3712 and a second-directional spring 3714 to achieve the desired bi-directional spring-loaded hinge 3640. Note that the side panel 3630 can have an appropriate hole, slot or other void 3710 into which the hinge 3712 rotates when the side panel 3630 is collapsed against the door, as shown in FIG. 38. With reference to FIG. 39, the side panel is shown folding directly against the trailer door, such that there is minimal stack-up 3920 of the side panel beyond the trailer. The cut-outs 3710 and off-centered metal hinge placement prevent the bunching up of multiple layers (panel, rolled hinge, rivets, etc.) when folded into the collapsed state. The rotational axis 3930 of the hinges are close enough to the trailer door hinges themselves that they become located rearward of the trailer doors when at the side of the trailer, where there is additional room for packaging thickness. A torsion spring can be provided at 3910, as shown in FIG. 39. The illustrative embodiment shows a "lift-off" design, where there is only one rolled hinge component per mounting surface—if it were mechanically desired, a second one could be added to either the panel or the trailer door to further constrain the hinge pin. The square-shaped cut-out 3710 allows for carriage bolts to be fastened with nuts on the inside of the door. Given that the head of a carriage bolt is a low-profile rounded surface, this allows the hinge to be fastened within the packaging limits of tight-fit trailers. This also provides additional anti-theft protection. Additionally, the top panel would likely use spring-loaded hinges to hold it in its deployed position. Due to its shorter panel length, a lightweight, sufficiently rigid panel material can be used to maintain the panel's shape rearward of the acting hinge seam. For trailers with flush or internal lockrods, the top panel hinges would look similar to the lateral hinges pictured hereinabove to minimize stack-up.

XIV) Sunk Trailer Door Cavity

Figures 40, 41:
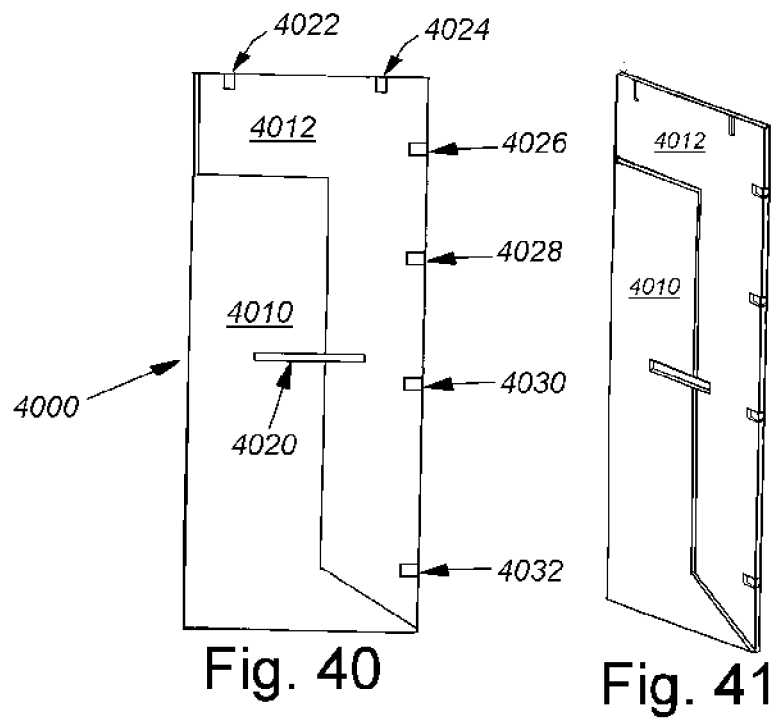
FIG. 40 is a rear perspective view of a sunk trailer door cavity, in accordance with an illustrative embodiment.
FIG. 41 is a perspective view of the sunk trailer door cavity rotated slightly to show the indentations in the outer surface, in accordance with the illustrative embodiment.
Figure 42:
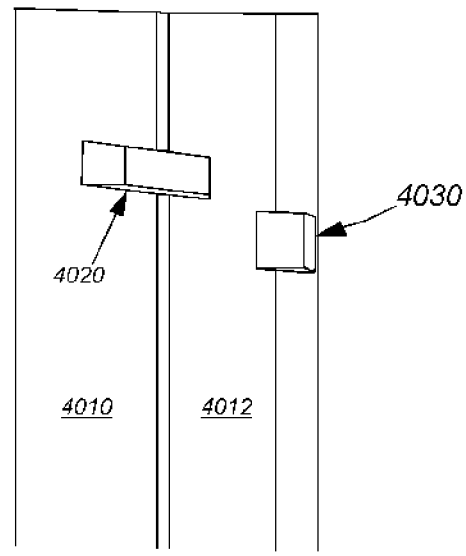
FIG. 42 is a partial perspective view detailing the surface indentations on the sunk trailer door cavity, in accordance with the illustrative embodiment.

Referring to FIGS. 40-42, a sunk trailer door cavity is shown, in accordance with an illustrative embodiment. The trailer door has a solid inner surface with a plurality of indentations on its outer surface to allow for aerodynamic structure components to be secured or otherwise packaged thereto. FIG. 40 is a rear perspective view of the sunk trailer door 4000 having an outer surface 4010 with an indented portion 4012 to accommodate for the panels. As shown, an indent 4020 is provided for a gas-spring mount or other appropriate linkage assembly, as well as indentations 4022, 4024, 4026, 4028, 4030 and 4032 for the hinges for example. FIG. 41 is a perspective view of the sunk trailer door cavity rotated slightly to show the indentations in the outer surface, in accordance with the illustrative embodiment. The surface indentations on the sunk trailer door cavity are shown in greater detail in FIG. 42, in accordance with the illustrative embodiment. As shown, the outer surface 4010 has indented portion 4012 for the side and/or top panels, and also includes indentation 4020 for an actuator, swing arm, or other assembly, and indentation 4030 for appropriate hinges and fasteners for fastening the door to the trailer and/or the aerodynamic structure. This allows the entire aerodynamic structure to package with no (zero) additional stack-up during loading and/or unloading.

XV) Curved Transition Tail

Figure 43:
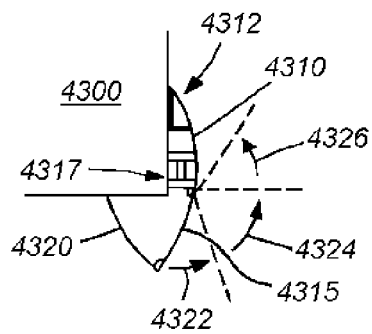
FIG. 43 is a top view of a side panel having a curved transition tail, shown in the deployed position, in accordance with an illustrative embodiment.

Reference is now made to FIGS. 43-48 showing various illustrative embodiments for increasing the efficiency of a short boat tail by energizing and redirecting airflow before the rear of the trailer to achieve increased flow attachment on the tail portion. This is particularly important for a short aerodynamic structure (for example, less than 20 inches). With reference to FIG. 43, a rigid panel 4310 is secured to the trailer 4300 and includes an inwardly compressible curved leading edge 4312 that is mounted to each side of the trailer 4300. A flexible panel 4315 is hingedly connected by hinge 4317 at the trailing edge of the rigid panel 4310. The hinge 4317 would have a hard backstop preventing the boat tail panel 4315 from folding inwardly while driving down the road. The flexible panel 4315 curves inward beyond the rear of the trailer. It is connected at one or more locations to the trailer door via cable(s) 4320 to provide rigidity for the aerodynamic structure. When the drive opens the trailer door (in the direction of arrows 4322, 4324, 4326), the flexible panel 4315 folds onto the leading edge 4312 and compresses it into its minimal stack-up position. This all occurs without additional driver involvement, beyond opening the doors in the traditional manner. The cable(s) 4320 can be unhooked from the door and the panel swung around and latched forward to disengage the unit without opening the door. The panel cannot be folded closed while the trailer doors are latched closed, but it is made of a flexible resilient material that deforms in a collision and returns to its normal shape.

Figure 44:
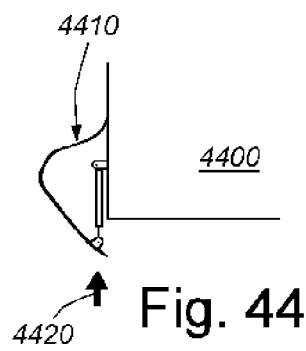
FIG. 44 is a side view of a top panel having a curved transitional tail, shown in the closed or collapsed position, in accordance with the illustrative embodiment.
Figure 45:
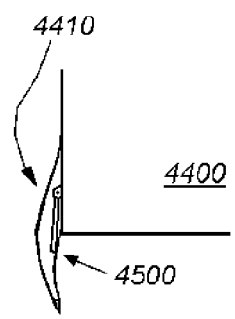
FIG. 45 is a side view of the top panel arrangement of FIG. 44, shown in the open or deployed position, in accordance with the illustrative embodiment.

Referring to FIGS. 44 and 45, a side view of a top panel arrangement is shown, respectively, in the closed and open positions. The top panel arrangement 4410 shown in FIGS. 44 and 45 can be combined with most side panel configurations shown and described herein, as well as others known in the art. The panel 4410 is attached to the roof of the trailer 4400 along the leading edge and forms a smooth shape that extends away from the top then back towards the ground with a gentle slope. In this embodiment, the top panel acts autonomously and independently from the side panels. The top panel always remains open, as shown in FIG. 45, until the unit is backed up against a structure such as a dock, and a force 4420 is exerted on the panel (as shown in FIG. 44), which causes the panel to transition to the closed panel. The top panel is at an angle so as to not interfere with opening the doors of the trailer. When the vehicle 4400 backs against a surface, the top panel is pushed back (arrow 4420) into a deformed position. When the vehicle moves away from the surface, the panel is forced back into an active shape by an energy storage device 4500, such as a gas spring, mechanical spring, or active electric or pneumatic power. These mechanisms are desirably mounted above the trailer doors, so that there is no interference when the trailer doors fold around to the side of the trailer.

Figure 46:
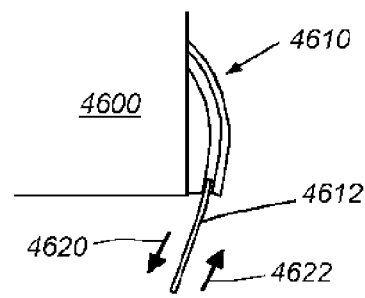
FIG. 46 is a top view of a side panel having a curved transition tail and an inner sliding manually retractable panel, shown in the open or deployed position, in accordance with an illustrative embodiment.

FIG. 46 is a top view of a side panel having a curved transition tail and an inner sliding manually retractable panel, shown in the open or deployed position, in accordance with an illustrative embodiment. As shown, a rigid panel 4610 is secured to the side of the trailer 4600 and includes an internal track. Contained within the track is a panel 4612 that slides rearward to complete the shape of the aerodynamic structure. A driver must manually extend (arrow 4620) and retract (4622) the panel 4612 when making deliveries.

Figure 47:
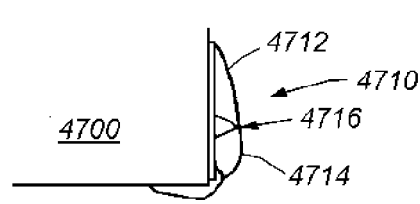
FIG. 47 is a side view of a top panel having a curved transition tail comprising a two-piece panel assembly, shown in the retracted or closed position, in accordance with an illustrative embodiment.
Figure 48:
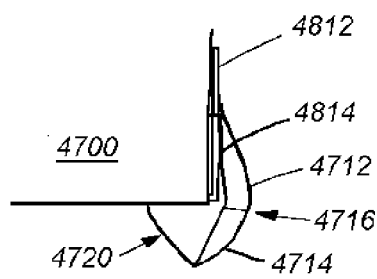
FIG. 48 is a side view of the top panel of FIG. 47, shown in the open or deployed position, in accordance with the illustrative embodiment.

Reference is now made to FIGS. 47 and 48 detailing various panel arrangements for a side and/or a top panel, in accordance with an illustrative embodiment. For illustrative purposes, FIGS. 47 and 48 are described as being a top view of a side panel; however they can also be a side view of a top panel having the same geometry and arrangement of components. FIG. 47 is a top view of a side panel having a curved transition tail comprising a two-piece panel assembly, shown in the retracted or closed position, in accordance with an illustrative embodiment. The side panel assembly 4710 includes a two-piece rigid plastic form comprising a first piece 4712 and a second piece 4714, each respectively on sliding tracks 4812, 4814 (show in FIG. 48) on the side of the trailer (or on the top of the trailer in top panel embodiments). The side panel 4710 is separated into two parts 4712, 4714, and the sliding component of the side is linked to the top. To disengage the unit and access the cargo, the pieces are slid rearward (as shown in FIG. 47) and slid rearward on their tracks until it latches closed at latch 4716. To engage the unit, the solid unit is slid forward. A cable 4720 gains tension as the unit 4710 extends rearward, and pulls the panel in towards the center rear of the trailer creating an inward slope, as shown in FIG. 48.

XVI) Automatically Adjusting Vanes

Figure 49:
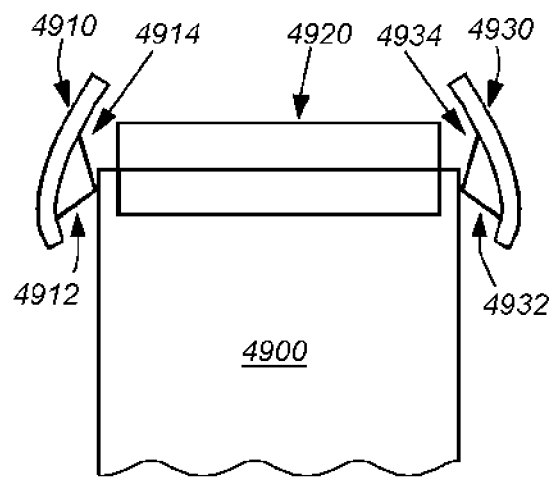
FIG. 49 is a top view of an aerodynamic structure comprising upper and side automatically adjusting vanes, in accordance with an illustrative embodiment.
Figure 50:
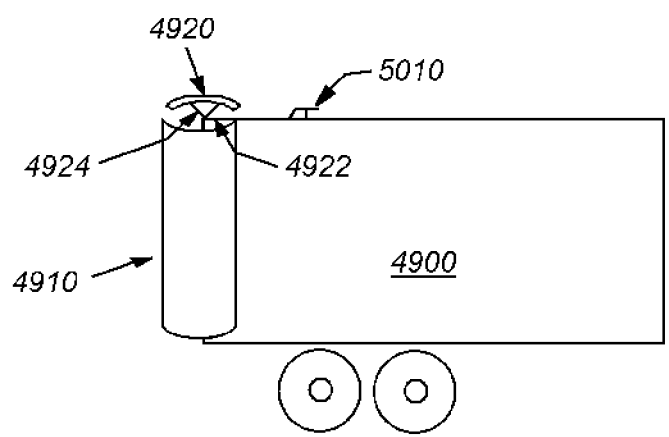
FIG. 50 is a side view of the aerodynamic structure of FIG. 49, in accordance with the illustrative embodiment.

Reference is now made to FIGS. 49 and 50 showing, respectively, top and side views of an aerodynamic structure comprising upper and side automatically adjusting vanes secured to a trailer 4900 or other cargo body, in accordance with an illustrative embodiment. Illustratively, a side vane 4910 is secured to the trailer 4900 by a plurality of linear or rotary actuators 4912, 4914. The top (or upper) vane 4920 is likewise secured to the trailer by actuators 4922, 4924 (shown in FIG. 50). Another side vane 4930 is secured to the trailer 4900 by a plurality of linear or rotary actuators 4932, 4934. Although two actuators are depicted for each side vane, it is contemplated that a single actuator, or a larger number of actuators, can be employed, and anchored to the vanes at the desired locations, to achieve the desired aerodynamic shape of the vanes. The vanes 4910, 4920 and 4930 are constructed and arranged to be mounted to the top and/or sides of the trailer 4900. The vanes 4910, 4920, 4930 do not touch the trailer at the leading edge, so that the air can travel between the trailer 4900 and the vanes 4910, 4920, 4930, and then have airflow curved inward to reduce pressure drag. There is typically a gap (approximately one-half inch to three inches) between the side of the trailer and the vane, such that air becomes trapped between the inner surface of the vane and the trailer and it curves inward past the rear of the trailer, and forces the air where it is desired. This significantly reduces (improves) suction drag. The linkages 4912, 4914, 4922, 4924, 4932, 4934 connecting the vanes to the trailer 4900 include linear and/or rotary actuators (or equivalent known in the art) such that the panel can be rotated and/or reshaped by pushing or pulling on different panel mounting points. This allows the vanes to change their shape to optimize aerodynamic gains at different speeds and crosswinds. The actuators 4912, 4914, 4922, 4924, 4932, 4934 are also able to compress the vanes against the trailer side for minimal stack-up during loading scenarios.

With reference to FIG. 50, a wind sensor 5010 can be provided, as well as integration into ABS or other existing vehicle control to power the actuators based upon a speed signal or other indication from the sensor(s) or vehicle control. The actuators can thus be controlled to chance linear and/or angular position of the vanes through the information received from the sensor(s) of the vehicle or cargo body. The vanes can be changed automatically based upon speed or crosswind to achieve optimum drag reduction. Changing the pivot point on the top and/or side panels, though control actuators, allows the actuators to shrink or grow to change the shape of the vane.

Various structures and arrangements for aerodynamic structures are shown herein. The various illustrative embodiments each provide advantages by improving fuel efficiency through reducing drag on the cargo body, and can be used individually, or combined to provide maximum improvement of aerodynamic efficiency. Additionally, various retraction and/or deployment arrangements are shown and described herein for manually and/or automatically deploying and/or retracting the aerodynamic structures. Moreover, various embodiments are shown herein for improving unwanted "stack-up" of aerodynamic structures when secured behind a vehicle or cargo body.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, additional attachments and improvements can be made to the rear of the vehicle to further enhance the security and capabilities of the aerodynamic structure of this invention. Such enhancements can include extended bumper assemblies that project rearward beyond the folded aerodynamic assemblies, or special reflectors and/or lighting on the edges of the structure and/or spacer frame. Similarly, while not shown, any of the embodiments described herein can include flexible or rigid gaskets or other seal members that extend between the aerodynamic assembly and the trailer body to further streamline the junction therebetween. The panels can be constructed from a variety of durable materials or a combination of materials. For example, the panels can include rigid or semi-rigid frames covered in a flexible fabric or similar sheet material. In further embodiments, a series of fabric or flexible wells of a predetermined shape (for example a bowl or dish shape) can be defined within the central cavity of each aerodynamic structure when deployed. Such a shape may well enhance the aerodynamic effect. Moreover, the actuation performed by the latches and the tab/spoiler assemblies can also be done with an electric solenoid system having contacts on the tab/spoiler and actuators on the latch that sense movement of the cargo body. In other embodiments, the tab mechanism can include an override in order to prevent deployment where the rear aerodynamic structure is desirably maintained in a retracted/non-deployed orientation. In addition, it is expressly contemplated that any of the mechanisms and features shown and described herein can be combined with other mechanisms and features as appropriate. Furthermore, directional and locational terms such as "top", "bottom", "center", "above", "below", "upper", "lower" and "side" should be taken as relative conventions only, and not as absolute. Accordingly, this description is meant to be taken only by way of example, and not to otherwise limit the scope of this invention.

What is claimed is:

1. An aerodynamic structure configured for attachment to a rear end of a cargo body comprising:
    an upper panel operatively connected to a side panel each configured to be hingedly mounted on a rear end of a cargo body, the upper panel and side panel configured to hinge between a folded position on the rear end of the cargo body to a deployed position on the rear end of the cargo body in which the upper panel and the side panel together define an aerodynamic structure with an internal cavity; and
    a linkage assembly operatively connected between the upper panel and the side panel so that hinged movement of the side panel causes movement of the linkage assembly in response thereto and hinged movement of the upper panel in response to the movement of the linkage assembly, and wherein the linkage assembly is hingedly mounted to a door of the cargo body.

2. The aerodynamic structure of claim 1 further comprising an element coupled to at least one of the upper panel or the side panel and extending rearwardly of the internal cavity of the aerodynamic structure when the aerodynamic structure is in the deployed position such that the element causes movement of the aerodynamic structure from the deployed position towards the folded position without damage in the event that the aerodynamic structure contacts a wall or other body while the aerodynamic structure is in its deployed position.

3. The aerodynamic structure of claim 2 wherein the element defines a most rearwardly protruding structure from the cargo body when the aerodynamic structure is in the deployed position.

4. The aerodynamic structure of claim 2 wherein the element comprises a bar.

5. The aerodynamic structure of claim 4 wherein the bar is coupled to the upper panel.

6. The aerodynamic structure of claim 2 wherein the element has a proximal end coupled to at least one of the upper panel or the side panel and a bulbous distal end opposite the proximal end.

7. The aerodynamic structure of claim 4 wherein the bar comprises a first part having a longitudinal axis generally planar with the upper panel and a second part having a longitudinal axis angled to the upper panel.

8. The aerodynamic structure of claim 4 wherein the bar is coupled to the side panel.

9. The aerodynamic structure of claim 1 wherein the linkage assembly is a swing arm assembly.

10. An aerodynamic structure configured for attachment to a rear end of a cargo body comprising:
    an upper panel operatively connected to a side panel each configured to be hingedly mounted on a rear end of a cargo body, the upper panel and side panel configured to hinge between a folded position on the rear end of the cargo body to a deployed position on the rear end of the cargo body in which the upper panel and the side panel together define an aerodynamic structure with an internal cavity; and
    a linkage assembly operatively connected between the upper panel and the side panel so that hinged movement of the side panel causes movement of the linkage assembly in response thereto and hinged movement of the upper panel in response to the movement of the linkage,
    wherein the upper panel comprises at least a first upper foldable panel section and a second upper foldable panel section, and wherein the first upper foldable panel section is directly hinged to the second upper foldable panel section at one end and directly hinged to the side panel at an opposite end to enable concurrent movement of the upper and side panels between the deployed position and the folded position.

11. An aerodynamic structure configured for attachment to a rear end of a cargo body comprising:
    an upper panel operatively connected to a side panel each configured to be hingedly mounted on a rear end of a cargo body, the upper panel and side panel configured to hinge between a folded position on the rear end of the cargo body to a deployed position on the rear end of the cargo body in which the upper panel and the side panel together define an aerodynamic structure with an internal cavity; and
    a linkage assembly operatively connected between the upper panel and the side panel so that hinged movement of the side panel causes movement of the linkage assembly in response thereto and hinged movement of the upper panel in response to the movement of the linkage,
    wherein the side panel comprises at least a split side panel section and a side panel section, and wherein the split side panel section is directly hinged to the upper panel at one end and directly hinged to the side panel section at an opposite end to enable concurrent movement of the upper and side panels between the deployed position and the folded position.

12. The aerodynamic structure of claim 11, wherein the upper panel overlies the side panel when the aerodynamic structure is in the folded position.

13. An aerodynamic structure configured for attachment to the rear of a vehicle having a generally vertical surface, the aerodynamic structure comprising:
    an upper panel configured to be hingedly mounted to the rear end of the vehicle proximal to a top of the vehicle;
    a side panel configured to be hingedly mounted to the rear end of the vehicle proximal to a side of the vehicle, wherein the upper panel and the side panel are hinged such that the upper panel and side panel move between at least a stowed position in which the panels are folded and at least a deployed position in which the panels are unfolded, and wherein the upper and side panels define part of an internal cavity; and
    an extension coupled to at least one of the upper panel and the side panel, wherein the extension projects from the internal cavity in a rearwardly direction when the aerodynamic structure is in the deployed position such that a force on the extension generally causes the upper and side panels to move from the deployed position to the stowed position.

14. The aerodynamic structure of claim 13 wherein the upper panel comprises a first upper foldable section and a second upper foldable section, the first upper foldable section directly hingedly coupled only to the second upper foldable section and a top edge of the side panel.

15. The aerodynamic structure of claim 14 further comprising a linkage assembly, wherein the linkage assembly is coupled to at least the second upper foldable section and the side panel.

16. The aerodynamic structure of claim 15 wherein the linkage assembly also is configured to be coupled to the rear end of the vehicle.

17. The aerodynamic structure of claim 13 wherein the side panel comprises a split side panel section and a side panel section, the split side panel section directly hingedly coupled only to the upper panel and the side panel section.

* * * * *